US012258145B2

(12) United States Patent
Sikora et al.

(10) Patent No.: US 12,258,145 B2
(45) Date of Patent: Mar. 25, 2025

(54) SUSPENDED LOAD STABILITY SYSTEMS AND METHODS

(71) Applicant: VITA INCLINATA IP HOLDINGS LLC, Broomfield, CO (US)

(72) Inventors: Derek Sikora, Denver, CO (US); Caleb B. Carr, Commerce City, CO (US); Logan Goodrich, Boulder, CO (US)

(73) Assignee: Vita Inclinata IP Holdings LLC, Broomfield, CO (US)

( * ) Notice: Subject to any disclaimer, the term of this patent is extended or adjusted under 35 U.S.C. 154(b) by 1266 days.

(21) Appl. No.: 16/988,373

(22) Filed: Aug. 7, 2020

(65) Prior Publication Data

US 2020/0369492 A1 Nov. 26, 2020

Related U.S. Application Data

(63) Continuation of application No. PCT/US2019/013603, filed on Jan. 15, 2019.

(60) Provisional application No. 62/757,414, filed on Nov. 8, 2018, provisional application No. 62/627,920, filed on Feb. 8, 2018.

(51) Int. Cl.
*B64D 9/00* (2006.01)
*B64C 17/00* (2006.01)
*B64D 1/08* (2006.01)
*B64D 1/22* (2006.01)
*B66D 1/48* (2006.01)
(Continued)

(52) U.S. Cl.
CPC ............... *B64D 9/00* (2013.01); *B64C 17/00* (2013.01); *B64D 1/08* (2013.01); *B64D 1/22* (2013.01); *B66D 1/485* (2013.01); *G05D 1/10* (2013.01); *H04W 4/026* (2013.01)

(58) Field of Classification Search
CPC .... B64D 9/00; B64D 1/08; B64D 1/22; B64C 17/00; B66D 1/485; G05D 1/10; H04W 4/026
See application file for complete search history.

(56) References Cited

U.S. PATENT DOCUMENTS 1,935,283 A    11/1933  Adams
2,264,936 A    12/1941  Dorsa
(Continued)

FOREIGN PATENT DOCUMENTS

AE    P60001212022    1/2022
AE    P60009522022    5/2022
(Continued)

OTHER PUBLICATIONS

Young, L.A., "Enhanced Rescue Lift Capability," 63rd Annual Forum of the AHS International, Virginia Beach, VA, May 1-3, 2007 (May 2007), Fig 2, 5, 12, 16, Abstract, p. 6-12.
(Continued)

*Primary Examiner* — Kyle O Logan
(74) *Attorney, Agent, or Firm* — Martin Spencer Garthwaite

(57) ABSTRACT

Load stability systems and methods for stabilizing swinging motions of suspended loads. The load stability systems include a fully automated, self-powered device that employs thrust to counteract and control lateral and rotational motion of an external load. The device is a temporary installment on the load, cable, or boom, and is agnostic to the platform from which it is suspended.

19 Claims, 22 Drawing Sheets

(51) Int. Cl.
 *G05D 1/00* (2006.01)
 *H04W 4/02* (2018.01)

(56) References Cited

U.S. PATENT DOCUMENTS

| | | | |
|---|---|---|---|
| 2,513,646 A | 7/1950 | August |
| 2,651,533 A | 9/1953 | Miller |
| 2,717,656 A | 9/1955 | Bannister |
| 3,036,797 A | 5/1962 | Agusta |
| 3,044,818 A | 7/1962 | Tobey |
| 3,210,115 A | 10/1965 | Irving et al. |
| 3,265,336 A | 8/1966 | Peterson |
| 3,498,476 A | 3/1970 | Mattson et al. |
| 3,554,468 A | 1/1971 | McVicar |
| 3,598,440 A | 8/1971 | Ramsden et al. |
| 3,601,342 A | 8/1971 | Piasecki |
| 3,602,544 A | 8/1971 | Marsh |
| 3,656,796 A | 4/1972 | Cook |
| 3,690,602 A | 9/1972 | Marsh |
| 3,724,817 A | 4/1973 | Simons |
| 3,829,052 A | 8/1974 | Flannelly |
| 3,833,189 A | 9/1974 | Fowler et al. |
| 3,838,836 A | 10/1974 | Asseo et al. |
| 3,904,156 A | 9/1975 | Smith |
| 3,946,971 A | 3/1976 | Chadwick |
| 4,124,181 A | 11/1978 | Kolwey |
| 4,138,078 A | 2/1979 | Hester et al. |
| 4,267,987 A | 5/1981 | McDonnell |
| 4,364,704 A | 12/1982 | Dreesen et al. |
| 4,378,919 A | 4/1983 | Smith |
| 4,553,719 A | 11/1985 | Ott |
| 4,601,444 A | 7/1986 | Lindenbaum |
| 4,695,012 A | 9/1987 | Lindenbaum |
| 4,747,745 A | 5/1988 | Pippen et al. |
| 4,826,109 A | 5/1989 | Camus |
| 4,881,601 A | 11/1989 | Smith |
| 4,883,184 A | 11/1989 | Albus |
| 4,889,297 A | 12/1989 | Ikeda |
| 4,984,757 A | 1/1991 | Hartung et al. |
| 5,071,184 A | 12/1991 | Dessaux |
| 5,071,573 A | 12/1991 | Coffindaffer et al. |
| 5,125,707 A | 6/1992 | Chaen et al. |
| 5,131,491 A | 7/1992 | Varner et al. |
| 5,143,326 A | 9/1992 | Parks |
| 5,190,250 A | 3/1993 | DeLong et al. |
| 5,249,652 A | 10/1993 | Leitzman et al. |
| 5,273,333 A | 12/1993 | Hatfield et al. |
| 5,299,845 A | 4/1994 | Gabriel |
| 5,344,203 A | 9/1994 | Tollenaere |
| 5,352,056 A | 10/1994 | Chandler |
| 5,358,219 A | 10/1994 | Shenk et al. |
| 5,396,815 A | 3/1995 | Polites et al. |
| 5,443,566 A | 8/1995 | Rushmer et al. |
| 5,451,032 A | 9/1995 | Rhoads |
| 5,465,925 A | 11/1995 | Connolly et al. |
| 5,499,785 A | 3/1996 | Roberts et al. |
| 5,518,205 A | 5/1996 | Wurst et al. |
| 5,524,870 A | 6/1996 | Tallent et al. |
| 5,562,394 A | 10/1996 | Brown, Jr. |
| 5,593,113 A | 1/1997 | Cox |
| 5,613,722 A | 3/1997 | Fandrich et al. |
| 5,816,636 A | 10/1998 | Gibson et al. |
| 5,871,249 A | 2/1999 | Williams |
| 5,898,746 A | 4/1999 | Bäversten et al. |
| 5,927,438 A | 7/1999 | Ostrobrod |
| 5,961,563 A | 10/1999 | Overton |
| 6,189,834 B1 | 2/2001 | Dietz et al. |
| 6,199,793 B1 | 3/2001 | Hainsworth et al. |
| 6,439,407 B1 | 8/2002 | Jacoff et al. |
| 6,533,220 B2 | 3/2003 | Schuster |
| D473,482 S | 4/2003 | Felmingham |
| 6,578,796 B2 | 6/2003 | Maeda |
| 6,708,926 B2 | 3/2004 | Bonisch |
| 6,814,185 B1 | 11/2004 | Ostrobrod |
| 6,983,833 B2 | 1/2006 | Ivers et al. |
| 7,028,351 B1 | 4/2006 | Frieder et al. |
| 7,131,515 B2 | 11/2006 | Gartsbeyn et al. |
| 7,267,240 B2 | 9/2007 | Maurer et al. |
| 7,720,582 B2 | 5/2010 | Makinadjian |
| D617,293 S | 6/2010 | Yoshihashi |
| 7,887,011 B1 | 2/2011 | Baldwin |
| 7,948,237 B2 | 5/2011 | Kuzmin et al. |
| 8,131,384 B2 | 3/2012 | Karpman et al. |
| 8,157,205 B2 | 4/2012 | McWhirk |
| 8,226,042 B1 | 7/2012 | Howell et al. |
| 8,231,083 B2 | 7/2012 | Kutzmann et al. |
| 8,292,229 B2 | 10/2012 | Pancotti et al. |
| D671,293 S | 11/2012 | Fredriksson |
| 8,413,923 B2 | 4/2013 | Brenner et al. |
| 8,496,279 B2 | 7/2013 | Aoki |
| 8,534,607 B2 | 9/2013 | Tardiff et al. |
| 8,534,608 B1 | 9/2013 | Cox, IV |
| 8,591,161 B1 | 11/2013 | Bernhardt |
| 8,840,355 B1 | 9/2014 | Kulesha |
| 8,886,402 B1 | 11/2014 | Lou |
| 8,888,048 B2 | 11/2014 | Figoureaux et al. |
| 8,894,050 B2 | 11/2014 | Wootten et al. |
| 8,899,903 B1 | 12/2014 | Saad et al. |
| 8,903,568 B1 | 12/2014 | Wang et al. |
| 8,925,901 B2 | 1/2015 | Gaillard |
| 8,938,325 B1 * | 1/2015 | McGinnis ............... B66C 13/08 |
| | | 701/4 |
| 8,967,533 B2 | 3/2015 | DeVaul et al. |
| 9,027,976 B1 | 5/2015 | Tollenaere |
| 9,096,294 B1 | 8/2015 | Dong et al. |
| 9,114,871 B2 | 8/2015 | Woodworth et al. |
| 9,194,977 B1 | 11/2015 | Dungan et al. |
| 9,205,922 B1 | 12/2015 | Bouwer |
| 9,223,008 B1 | 12/2015 | Hartman et al. |
| 9,242,741 B1 | 1/2016 | Cockell, II |
| 9,302,770 B2 | 4/2016 | Burgess et al. |
| 9,375,841 B1 | 6/2016 | Kemper |
| 9,422,139 B1 | 8/2016 | Bialkowski et al. |
| 9,676,481 B1 | 6/2017 | Buchmueller |
| 9,688,404 B1 | 6/2017 | Buchmueller et al. |
| 9,797,723 B1 | 10/2017 | Huang |
| 9,800,091 B2 | 10/2017 | Nugent, Jr. et al. |
| 9,836,063 B1 | 12/2017 | Bonawitz et al. |
| 9,849,981 B1 | 12/2017 | Burgess et al. |
| 9,850,113 B2 | 12/2017 | Melin et al. |
| 9,881,506 B1 | 1/2018 | Gentry |
| 9,908,756 B2 | 3/2018 | Heravi et al. |
| 9,958,876 B2 | 5/2018 | Lind et al. |
| 10,023,312 B2 | 7/2018 | Repp et al. |
| 10,023,313 B2 | 7/2018 | Behrens et al. |
| 10,071,804 B1 | 9/2018 | Buchmueller et al. |
| 10,112,805 B1 | 10/2018 | Joralmon |
| 10,286,943 B1 | 5/2019 | Greenblatt et al. |
| 10,451,504 B2 | 10/2019 | Campbell et al. |
| 10,519,013 B2 | 12/2019 | Curran et al. |
| 10,676,190 B2 | 6/2020 | Mitchell et al. |
| 10,870,558 B2 | 12/2020 | Sikora et al. |
| 10,899,586 B2 | 1/2021 | Cranney, III |
| 10,918,892 B2 | 2/2021 | Dickson |
| 10,940,061 B2 | 3/2021 | Sikora et al. |
| 10,960,976 B2 * | 3/2021 | Bosma ................... B64C 29/00 |
| 11,008,198 B2 | 5/2021 | Sikora et al. |
| 11,142,316 B2 | 10/2021 | Sikora et al. |
| 11,142,433 B2 | 10/2021 | Sikora et al. |
| 11,209,836 B1 | 12/2021 | Sikora et al. |
| 11,339,034 B2 | 5/2022 | Sikora et al. |
| 11,370,642 B2 | 6/2022 | Markwell |
| 11,535,496 B2 | 12/2022 | Al-Husseini et al. |
| 2002/0113448 A1 | 8/2002 | Kazerooni et al. |
| 2003/0085319 A1 | 5/2003 | Wagner et al. |
| 2003/0121024 A1 | 6/2003 | Hil et al. |
| 2003/0220177 A1 | 11/2003 | Orlando |
| 2003/0222177 A1 | 12/2003 | Bonisch |
| 2004/0026349 A1 | 2/2004 | Colgate et al. |
| 2004/0032140 A1 | 2/2004 | Solstad |
| 2005/0072965 A1 | 4/2005 | Sanders et al. |
| 2005/0242237 A1 | 11/2005 | Scott |
| 2006/0163892 A1 | 7/2006 | Nguyen et al. |
| 2007/0200032 A1 | 8/2007 | Fadie et al. |

(56) References Cited

U.S. PATENT DOCUMENTS

| | | |
|---|---|---|
| 2008/0027566 A1 | 1/2008 | Baek et al. |
| 2008/0272586 A1 | 11/2008 | Thompson |
| 2009/0004004 A1 | 1/2009 | Vincenzi |
| 2009/0152391 A1 | 6/2009 | McWhirk |
| 2009/0200428 A1 | 8/2009 | Smith et al. |
| 2010/0000349 A1 | 1/2010 | Stevens et al. |
| 2010/0012771 A1 | 1/2010 | Jess |
| 2010/0176618 A1 | 7/2010 | Souke et al. |
| 2010/0237183 A1 | 9/2010 | Wilson et al. |
| 2010/0291707 A1 | 11/2010 | Mirkin et al. |
| 2010/0319910 A1 | 12/2010 | Ives et al. |
| 2011/0192932 A1 | 8/2011 | Brenner et al. |
| 2012/0006779 A1 | 1/2012 | Mills et al. |
| 2012/0145832 A1 | 6/2012 | Schuster |
| 2012/0150364 A1 | 6/2012 | Tillotson et al. |
| 2012/0271582 A1 | 10/2012 | Bageshwar et al. |
| 2012/0292434 A1 | 11/2012 | Welsh |
| 2012/0293177 A1 | 11/2012 | Dodds |
| 2013/0054054 A1 | 2/2013 | Tollenaere et al. |
| 2013/0056586 A1 | 3/2013 | Occhiato et al. |
| 2013/0270393 A1 | 10/2013 | Shrapnel |
| 2013/0299634 A1 | 11/2013 | Haggard |
| 2014/0154965 A1 | 6/2014 | Han et al. |
| 2014/0224755 A1 | 8/2014 | Eriksson et al. |
| 2014/0252170 A1 | 9/2014 | Prud'homme-Lacroix |
| 2014/0333232 A1 | 11/2014 | Verheyen |
| 2015/0041598 A1 | 2/2015 | Nugent et al. |
| 2015/0151837 A1 | 6/2015 | Sane et al. |
| 2015/0360779 A1 | 12/2015 | Behrens et al. |
| 2016/0009393 A1 | 1/2016 | Repp et al. |
| 2016/0009531 A1 | 1/2016 | Saliba et al. |
| 2016/0031683 A1 | 2/2016 | Fenker et al. |
| 2016/0048131 A1 | 2/2016 | Lesperance et al. |
| 2016/0236779 A1 | 8/2016 | Thomas et al. |
| 2016/0240417 A1 | 8/2016 | Tomida |
| 2016/0297650 A1 | 10/2016 | Bang |
| 2016/0298962 A1 | 10/2016 | Lee |
| 2016/0332728 A1 | 11/2016 | Winfree et al. |
| 2016/0340030 A1 | 11/2016 | Roussey et al. |
| 2016/0340035 A1 | 11/2016 | Duru |
| 2016/0340039 A1 | 11/2016 | Waltner et al. |
| 2017/0009859 A1 | 1/2017 | Sevagen |
| 2017/0052676 A1 | 2/2017 | Pulier et al. |
| 2017/0073055 A1 | 3/2017 | Song |
| 2017/0088261 A1 | 3/2017 | Sequeira et al. |
| 2017/0129749 A1 | 5/2017 | Mijangos et al. |
| 2017/0138737 A1 | 5/2017 | Cordova et al. |
| 2017/0197718 A1* | 7/2017 | Buchmueller ........ B64C 39/024 |
| 2017/0217566 A1 | 8/2017 | Ichinose |
| 2017/0284795 A1 | 10/2017 | Carlson et al. |
| 2017/0291707 A1 | 10/2017 | Veronesi et al. |
| 2018/0072404 A1 | 3/2018 | Prager et al. |
| 2018/0099748 A1 | 4/2018 | Lesperance et al. |
| 2018/0208309 A1 | 7/2018 | Wang |
| 2018/0229855 A1 | 8/2018 | Sane et al. |
| 2018/0251346 A1 | 9/2018 | Thomson et al. |
| 2018/0252616 A1 | 9/2018 | Bryson et al. |
| 2018/0282130 A1 | 10/2018 | Kale et al. |
| 2018/0339891 A1 | 11/2018 | Jadi-Maghsoodi et al. |
| 2019/0016480 A1 | 1/2019 | Kashiwa et al. |
| 2019/0031474 A1 | 1/2019 | Stilborn et al. |
| 2019/0033892 A1 | 1/2019 | Gomez et al. |
| 2019/0055111 A1 | 2/2019 | Cranney, III |
| 2019/0193827 A1 | 6/2019 | Zerweckh |
| 2019/0236370 A1 | 8/2019 | Man |
| 2019/0241267 A1 | 8/2019 | Sikora et al. |
| 2019/0337776 A1 | 11/2019 | Fanello et al. |
| 2020/0087121 A1 | 3/2020 | Ohayon et al. |
| 2020/0165010 A1 | 5/2020 | Sun et al. |
| 2020/0210704 A1 | 7/2020 | Han et al. |
| 2020/0222257 A1 | 7/2020 | Sikora et al. |
| 2020/0231415 A1 | 7/2020 | Sikora et al. |
| 2020/0271270 A1 | 8/2020 | Sikora et al. |
| 2020/0369492 A1 | 11/2020 | Sikora et al. |
| 2020/0400330 A1 | 12/2020 | Przybylski et al. |
| 2021/0371250 A1 | 12/2021 | Bedgood et al. |
| 2021/0371252 A1 | 12/2021 | Sikora et al. |
| 2022/0121225 A1 | 4/2022 | Sikora et al. |
| 2022/0135378 A1 | 5/2022 | Sikora et al. |
| 2022/0274696 A1 | 9/2022 | Sikora et al. |
| 2022/0274809 A1 | 9/2022 | Sikora et al. |
| 2022/0277472 A1 | 9/2022 | Birchfield et al. |
| 2022/0281721 A1 | 9/2022 | Sikora et al. |
| 2022/0371736 A1 | 11/2022 | Sikora et al. |
| 2023/0117935 A1 | 4/2023 | Al-Husseini et al. |

FOREIGN PATENT DOCUMENTS

| | | |
|---|---|---|
| AE | P60009562022 | 5/2022 |
| AU | 2020223104 A1 | 9/2021 |
| AU | 2020316044 A1 | 2/2022 |
| AU | 2019217244 C1 | 3/2022 |
| AU | 2020391500 A1 | 6/2022 |
| AU | 2020394206 A1 | 6/2022 |
| CA | 3148446 A1 | 1/2021 |
| CA | 3159310 | 5/2022 |
| CA | 3159437 | 5/2022 |
| CN | 114423703 A | 4/2022 |
| EP | 3749604 A0 | 8/2020 |
| EP | 3924251 A1 | 12/2021 |
| EP | 3999463 A1 | 5/2022 |
| EP | 208930347 | 5/2022 |
| EP | 208930354 | 5/2022 |
| GB | 2327657 A | 2/1999 |
| GB | 2457149 A | 8/2009 |
| GB | 2513646 A | 11/2014 |
| IN | 202217035319 | 6/2022 |
| IN | 202217036526 | 6/2022 |
| IR | 14005014000300827 | 1/2022 |
| JP | H04256686 A | 9/1992 |
| JP | 04256686 | 11/1992 |
| JP | H0543184 A | 2/1993 |
| JP | H05193584 A | 8/1993 |
| JP | 07179288 | 7/1995 |
| JP | H07179288 A | 7/1995 |
| JP | H09317795 A | 12/1997 |
| JP | 10305989 | 11/1998 |
| JP | H1111859 A | 1/1999 |
| JP | 2016210607 A | 12/2016 |
| JP | 6554258 B1 | 7/2019 |
| JP | 2021011386 A | 2/2021 |
| JP | 2022529961 A | 6/2022 |
| JP | 2022530316 A | 6/2022 |
| KR | 1020227021644 | 6/2022 |
| KR | 1020227021645 | 6/2022 |
| NO | 20171181 A1 | 1/2019 |
| RU | 2022101373 | 1/2022 |
| WO | 2011012915 A1 | 2/2011 |
| WO | 2014076189 A1 | 5/2014 |
| WO | 2018090104 A1 | 5/2018 |
| WO | 2018234670 A1 | 12/2018 |
| WO | WO2019156782 A1 | 1/2019 |
| WO | WO2021016277 | 7/2020 |
| WO | 2020167867 A1 | 8/2020 |
| WO | 2020176665 A1 | 9/2020 |
| WO | WO2021108703 | 11/2020 |
| WO | WO2021108714 | 11/2020 |
| WO | 2021194628 A2 | 9/2021 |
| WO | 2021194628 A3 | 12/2021 |
| WO | PCTUS2165355 | 12/2021 |

OTHER PUBLICATIONS

Phillip J. McKerrow, The design of a tethered aerial robot, Faculty of Informatics—Papers (Archive) Faculty of Engineering and InformationSciences University of Wollongong, Oct. 4, 2007, pp. 1-8, University of Wollongong, Australia, https://ro.uow.edu.au/infopapers/519.

U.S. Appl. No. 16/847,448, filed Apr. 13, 2020, Derek, Sikora, Entire Document.

U.S. Appl. No. 17/748,985, filed May 19, 2022, Derek Sikora, Entire Document.

(56) References Cited

OTHER PUBLICATIONS

U.S. Appl. No. 17/750,015, filed May 20, 2022, Derek Sikora, Entire Document.
U.S. Appl. No. 17/752,509, filed May 24, 2022, Derek Sikora, Entire Document.
U.S. Appl. No. 17/875,873, filed Jul. 28, 2022, Derek Sikora, Entire Document.
U.S. Appl. No. 59/613,722, filed Mar. 25, 1997, Fandrich et al, Entire Document.
U.S. Appl. No. 62/627,920, filed Feb. 8, 2018, Derek Sikora, Entire Document.
U.S. Appl. No. 62/804,020, filed Feb. 11, 2019, Derek Sikora, Entire Document.
U.S. Appl. No. 62/810,875, filed Feb. 26, 2019, Derek Sikora, Entire Document.
U.S. Appl. No. 62/833,394, filed Apr. 12, 2019, Derek Sikora, Entire Document.
U.S. Appl. No. 62/876,721, filed Jul. 21, 2019, Caleb B. Carr, Entire Document.
U.S. Appl. No. 62/940,155, filed Nov. 25, 2019, Derek Sikora, Entire Document.
U.S. Appl. No. 62/966,851, filed Jan. 28, 2020, Derek Sikora, Entire Document.
International Search Report dated Apr. 30, 2020, for PCT Application No. PCT/US2020/017790, filed Feb. 11, 2020.
International Search Report in PCT/US2020/062414, mailed Feb. 19, 2021.
International Search Report mailed Apr. 3, 2019, for PCT /US19/13603 filed by Jan. 15, 2019.
Written Opinion mailed Apr. 3, 2019, for PCT/US19/13603 filed Jan. 15, 2918.
Written Opinion mailed Apr. 30, 2020 for PCT/US2020/017790, filed Feb. 11, 2020.
Written Opinion mailed Feb. 19, 2021, for PCT/US2020/062414.
Written Opinion mailed May 27, 2020 for PCT/US20/19967, Fliled Feb. 26, 2020.
Young, L.A, "Enhanced Rescue Life Capability", 63rd Annual Forum of the AHS International, Virginia Beach, VA, May 1-3 ). 2007(May 2007). Fig.2,5, 12,16, Abstract pp. 6-12.
International Search Report mailed Mar. 4, 2019, for PCT/US19/13603 filed Jan. 15, 2019.
International Search Report mailed Apr. 30, 2020, for PCT Application No. PCT/US2020/017790, filed Feb. 11, 2020.
International Search Report mailed May 27, 2020, for PCT/US20/19967 filed Feb. 26, 2020.
Written Opinion mailed Apr. 3, 2019, for PCT/us19/13603 filed Jan. 15, 2019.
Written Opinion mailed Apr. 30, 2020, for PCT Application No. PCT/US2020/017790, filed Feb. 11, 2020.
Written Opinion mailed May 27, 2020, for PCT/US20/19967 Filed Feb. 26, 2020.
Young, L.A., "Enhanced Rescue Lift Capability," 63rd Annual Forum of the AHS International, Virginia Beach, VA, May 1-3, 2007 (May 2007), Retrieved Mar. 8, 2019, https://rotorcraft.arc.nasa.gov/Publications/files/Young2007Enhanced.pdf Fig. 2, 5, 12, 16, Abstract, pp. 6-12.
Written Opinion mailed Oct. 6, 2020 for PCT/US2020/042936 filed Jul. 21, 2020.
All pages, Written Opinion dated Apr. 30, 2020 for PCT Application No. PCT/US2020/017790, filed Feb. 11, 2020.
Extended European Search Report and Search Opinion, Application No. EP 19 751 097.7, mailed Aug. 31, 2021, 15 pages.
International Search Report in PCT/US2020/062414, mailed Feb. 19, 2021, entire document.
International Search Report mailed Oct. 6, 2020, for PCT/US2020/042936, filed Jul. 2020.
Written Opinion in PCT/US2020/062414, mailed Feb. 19, 2021, entire document.
Multiple Authors, "Kalman filter", revision dated Feb. 3, 2018, Wikipedia, available worldwide.
Multiple Authors, "Nonlinear filter", revision dated Jul. 27, 2017, Wikipedia, available worldwide.

\* cited by examiner

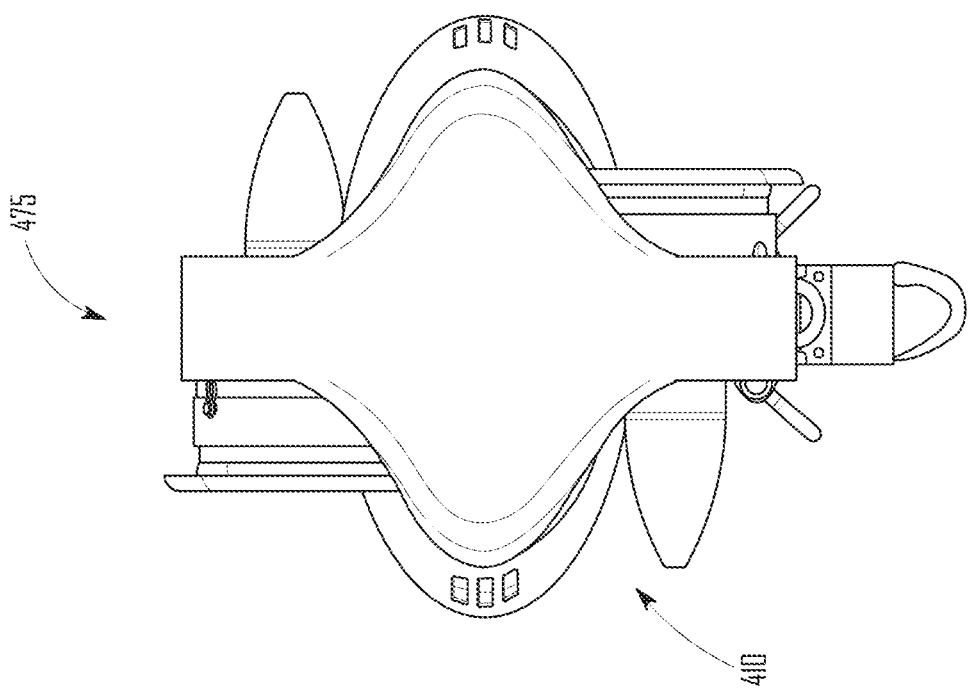
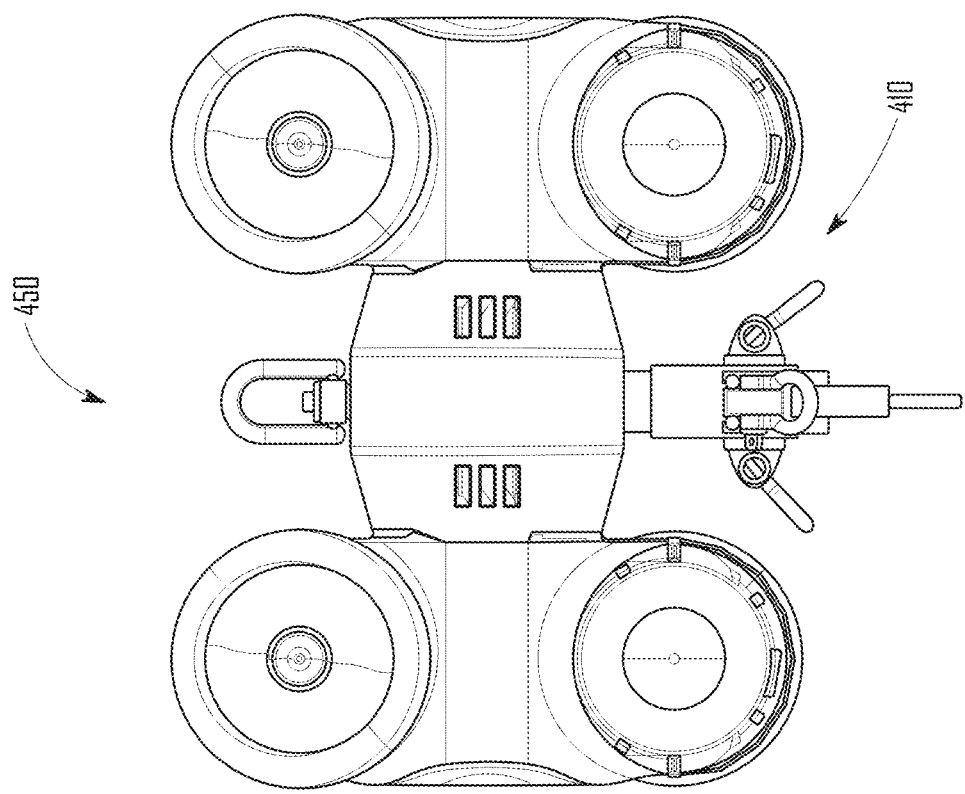

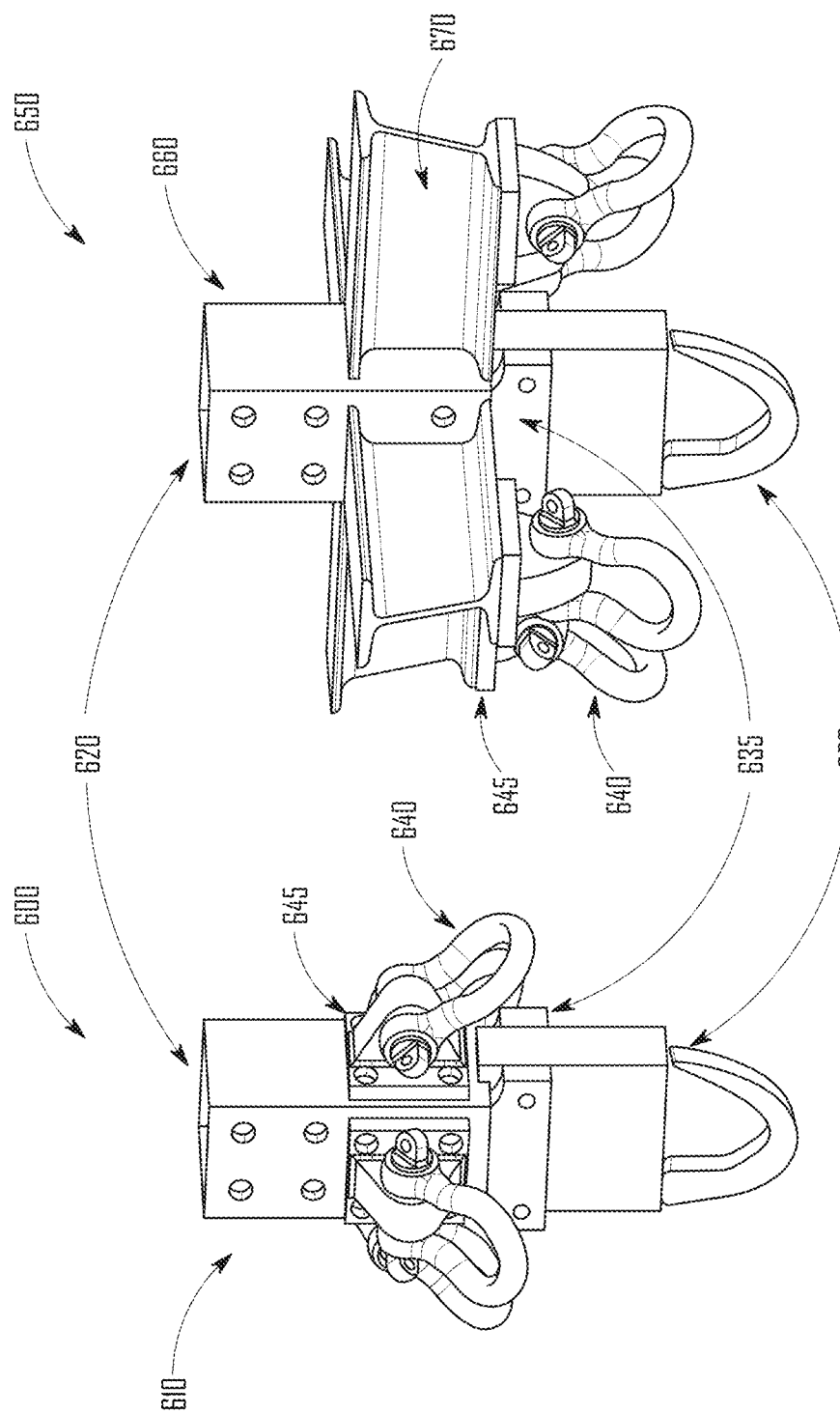

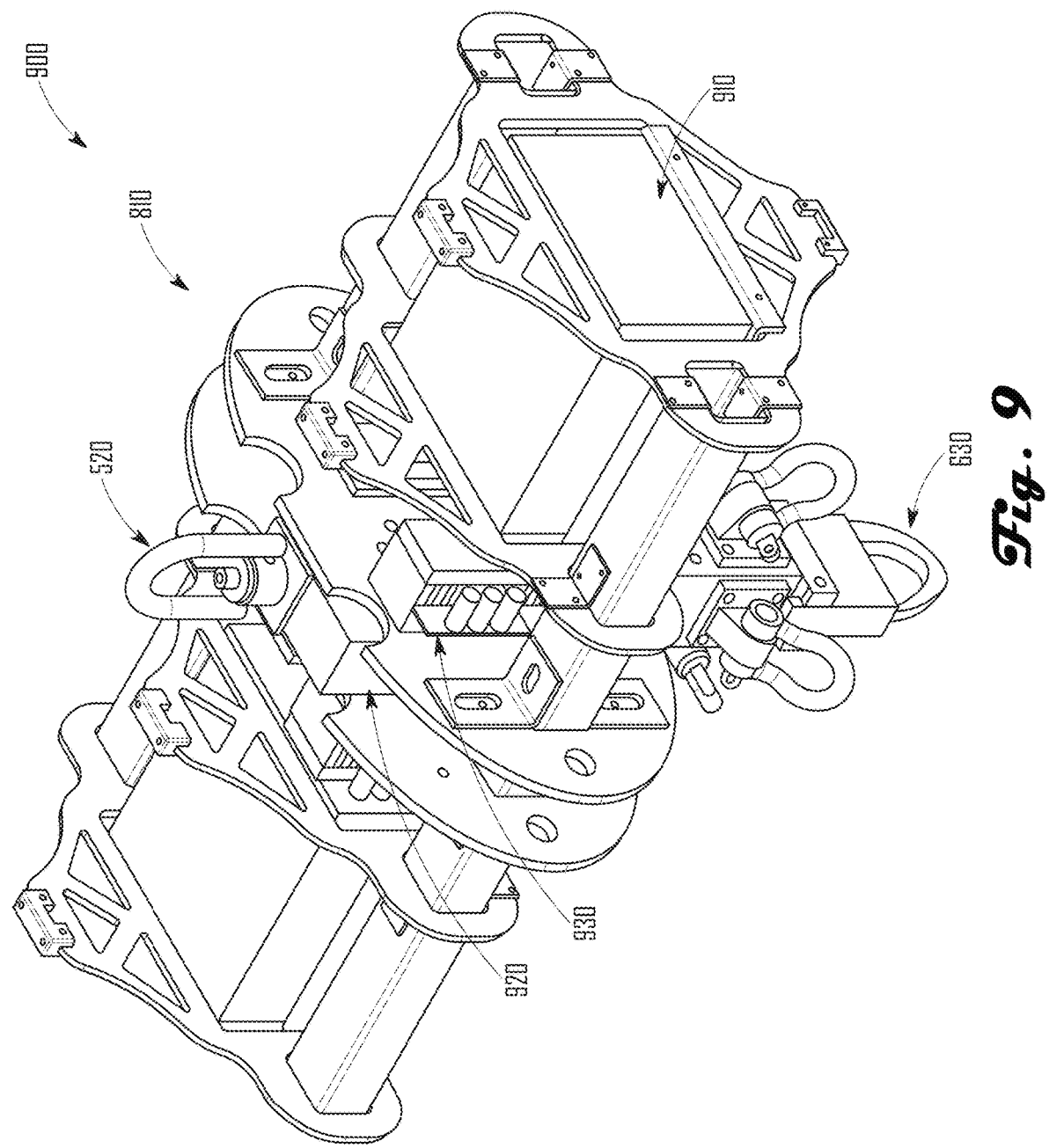

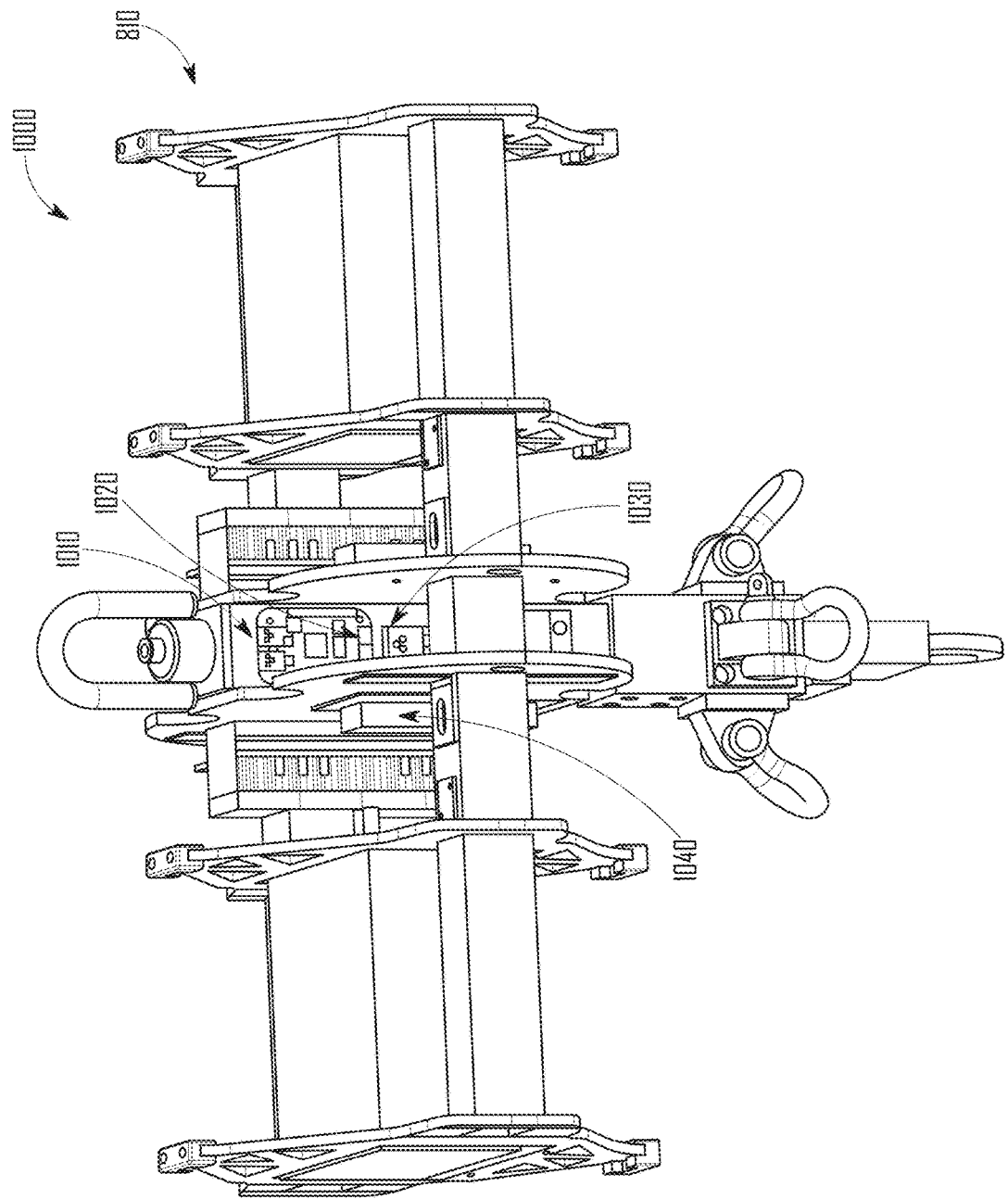

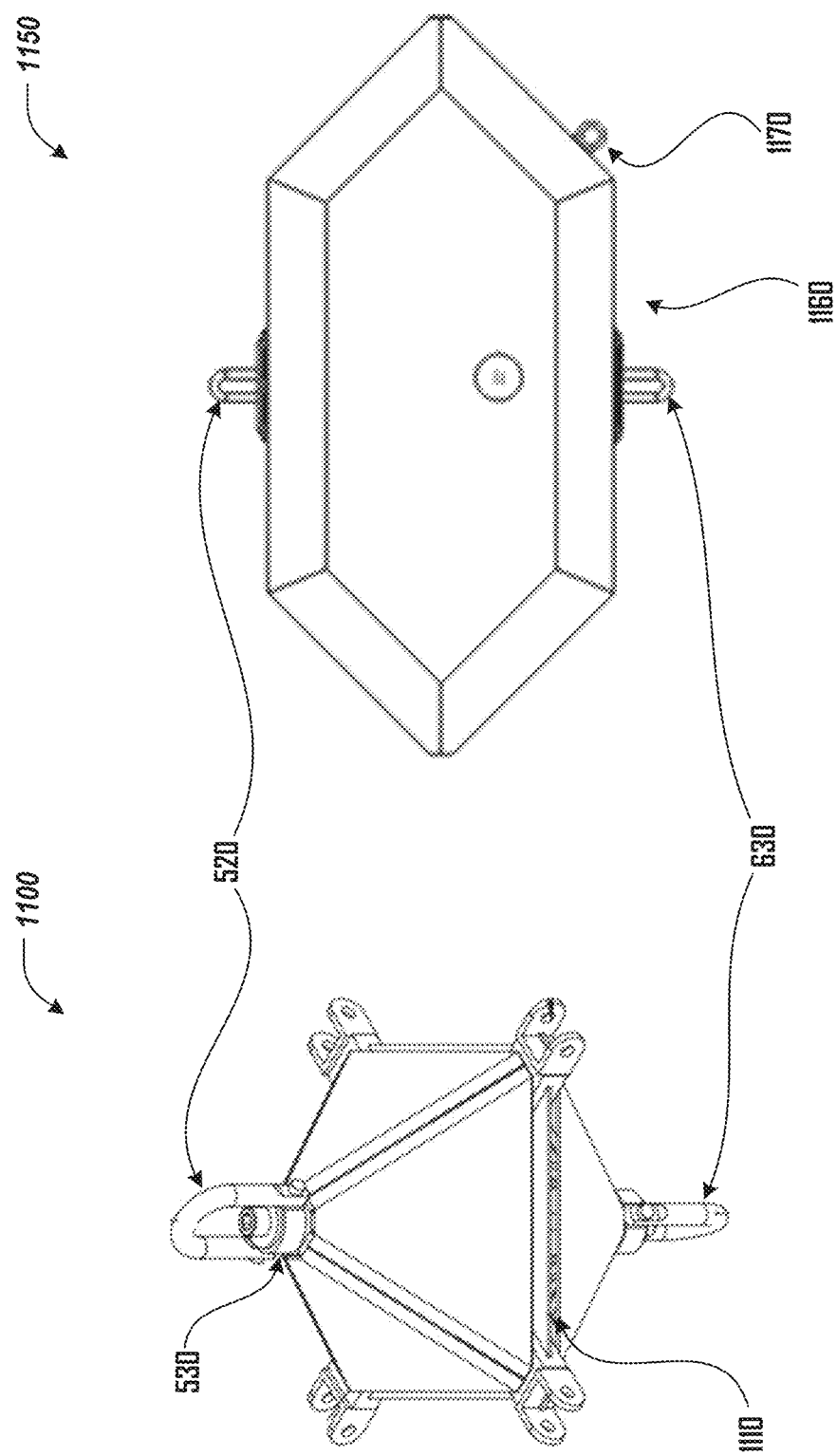

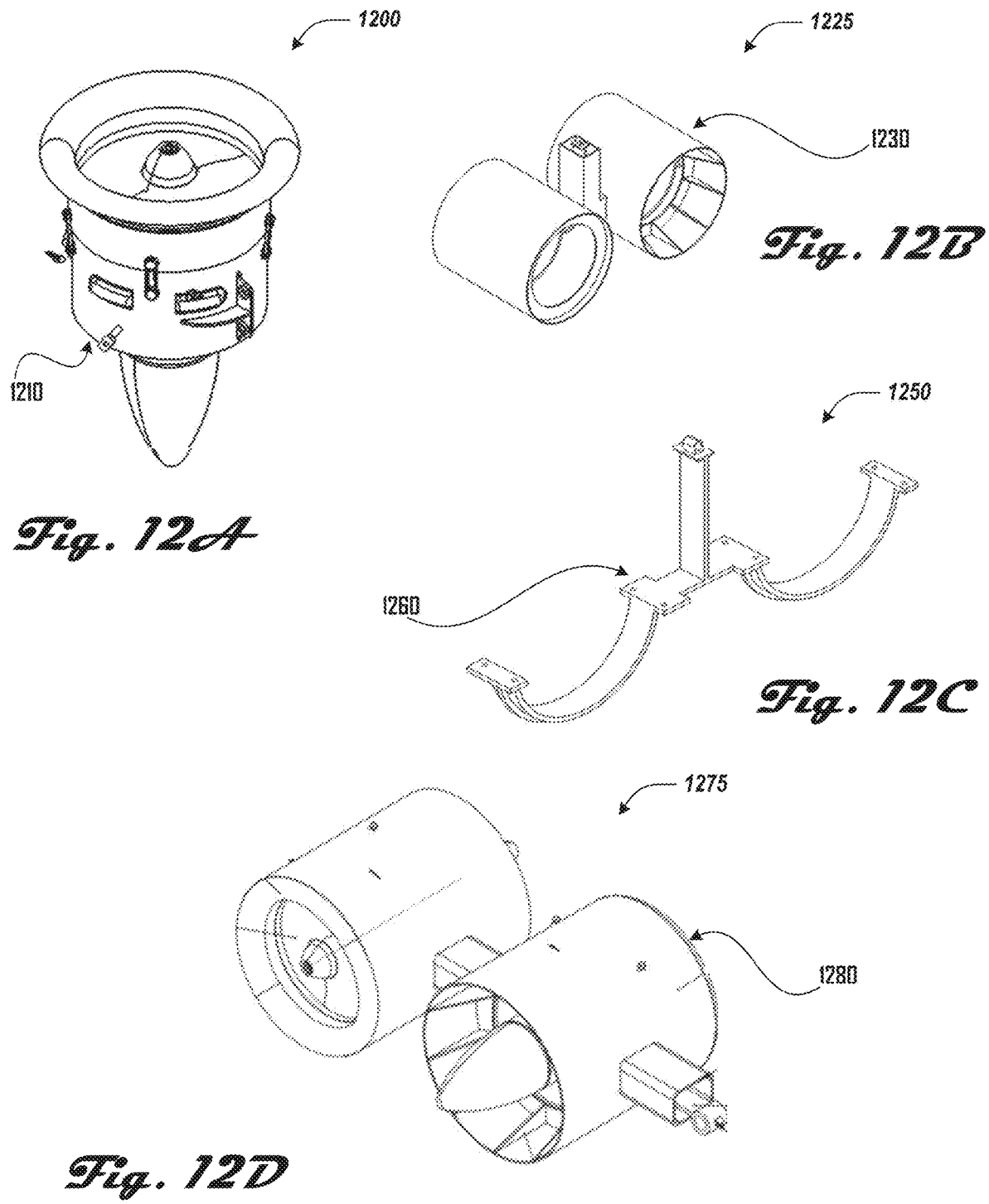

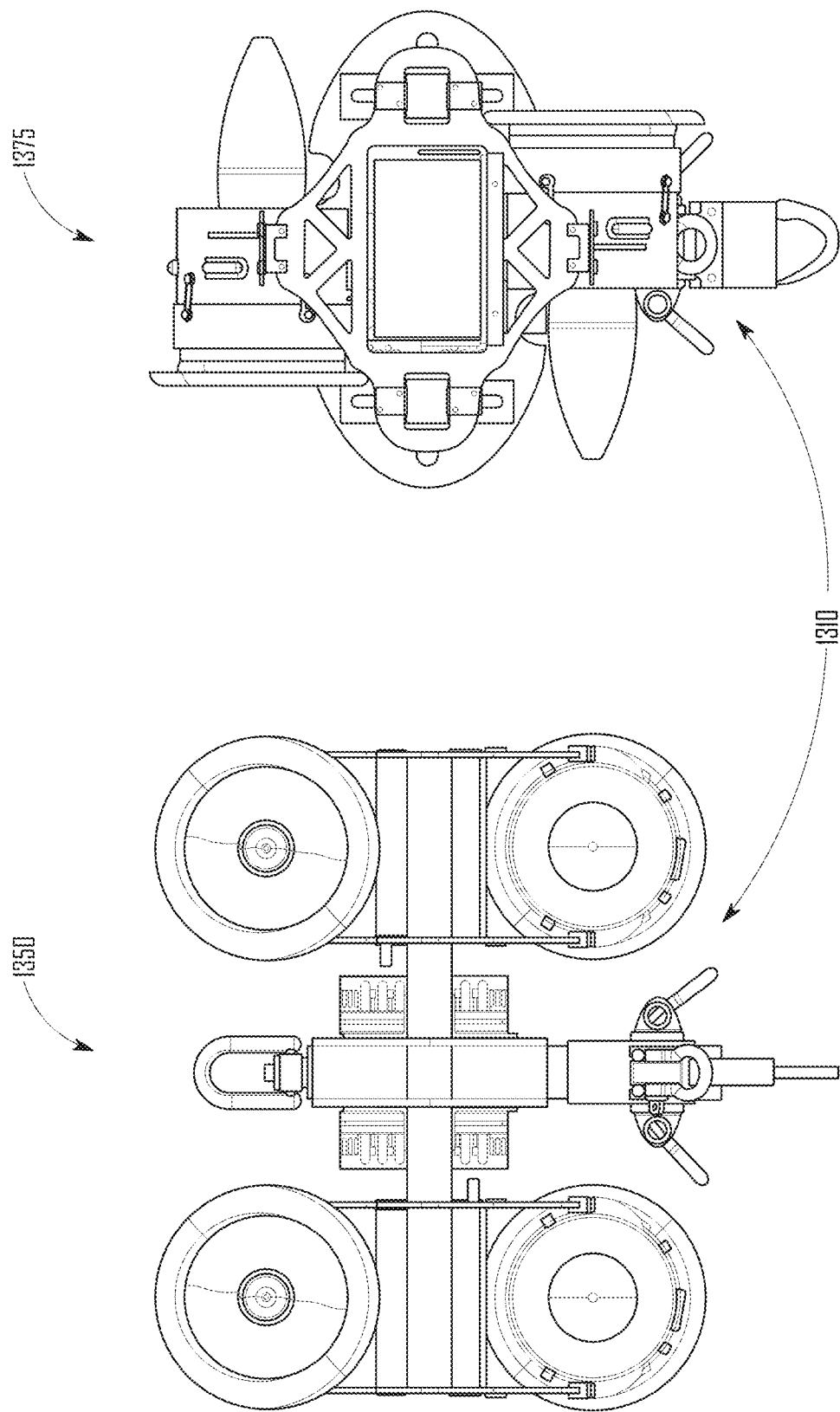

SUSPENDED LOAD STABILITY SYSTEMS AND METHODS

This application claims priority to provisional U.S. Patent Application No. 62/627,920, filed Feb. 8, 2018, titled "SUSPENDED LOAD STABILITY SYSTEM THROUGH SELF POWERED AUTOMATED ELECTRIC DUCT FAN CONTROL," naming Derek Sikora and Jonathan Chung as inventors, provisional U.S. Patent Application No. 62/757,414, filed on Nov. 8, 2018, titled "LOAD STABILITY SYSTEM FOR SUSPENDED LOAD CHAOTIC MOTION," and naming Caleb Carr, Derek Sikora, and Logan Goodrich as inventors, and Patent Cooperation Treaty Patent Application No. PCT/US2019/013603, filed on Jan. 15, 2019, naming Caleb Carr, Derek Sikora, and Logan Goodrich as inventors. The above cited applications are hereby incorporated by reference, in their entireties, for all purposes. The Application Data Sheet filed herewith forms a part of the present application, and all priority documents to which it refers are incorporated by reference herein in their entirety.

FIELD

This disclosure is directed to improved systems and methods to control suspended loads.

BACKGROUND

Rescue helicopters allow for quick access to injured or isolated patients on sea or land. More times than not, the patients are injured or have a medical emergency that warranted the local or federal authorities to authorize the use of an expensive helicopter hoisting operation. During these operations, however, hoisting extractions are subject to winds and other external factors that cause the rescue hoist to spin and swing back and forth. This swinging complicates the mission, causes delays in medical care, and has led to deaths both of rescuers and the rescuees.

In modern helicopter hoist, rescue, and sling load operations there is often unstable, hazardous motion of the suspended person or equipment that endangers the operation at hand and, more importantly, the people involved. The observed motion is comparable to a lateral or conical pendulum, with rotation about the hinge pivot point. A mission-critical attribute of the hoist system operability remains unsolved: reliable stability of slung cable motion. Uncontrolled cable motion endangers lives, jeopardizes mission success, sacrifices mission opportunities due to environmental elements, and drastically increases operational costs.

BRIEF DESCRIPTION OF THE DRAWINGS

FIGS. 4A-4C illustrate perspective, front, and side views of a suspended load stability system including an aerodynamic housing in accordance with one embodiment.

FIGS. 6A-6B illustrate two alternative sleeves that connect to the central structural member for attaching a load in accordance with one embodiment.

FIG. 9 illustrates a perspective view of components mounted in the structural framework of a suspended load stability system in accordance with one embodiment.

FIG. 10 illustrates a perspective view of components of a suspended load stability system mounted in the structural framework in accordance with one embodiment.

FIG. 11A illustrates a perspective view of an alternative center module design of a suspended load stability system in accordance with one embodiment.

FIG. 11B illustrates a front view of another alternative center module design of a suspended load stability system in accordance with one embodiment.

FIG. 12A illustrates a perspective view of a thruster configured for use in a suspended load stability system in accordance with one embodiment.

FIG. 12B illustrates a perspective view of a two-thruster propulsion arm of a suspended load stability system in accordance with one embodiment.

FIG. 12C illustrates a perspective view of a support member for a two-thruster propulsion arm of a suspended load stability system in accordance with one embodiment.

FIG. 12D illustrates an isometric view of another two-thruster propulsion arm of a suspended load stability system in accordance with one embodiment.

FIGS. 13A-13C illustrate perspective, front, and side views of thrusters mounted in the structural framework of a suspended load stability system in accordance with one embodiment.

DETAILED DESCRIPTION

Figure 1:
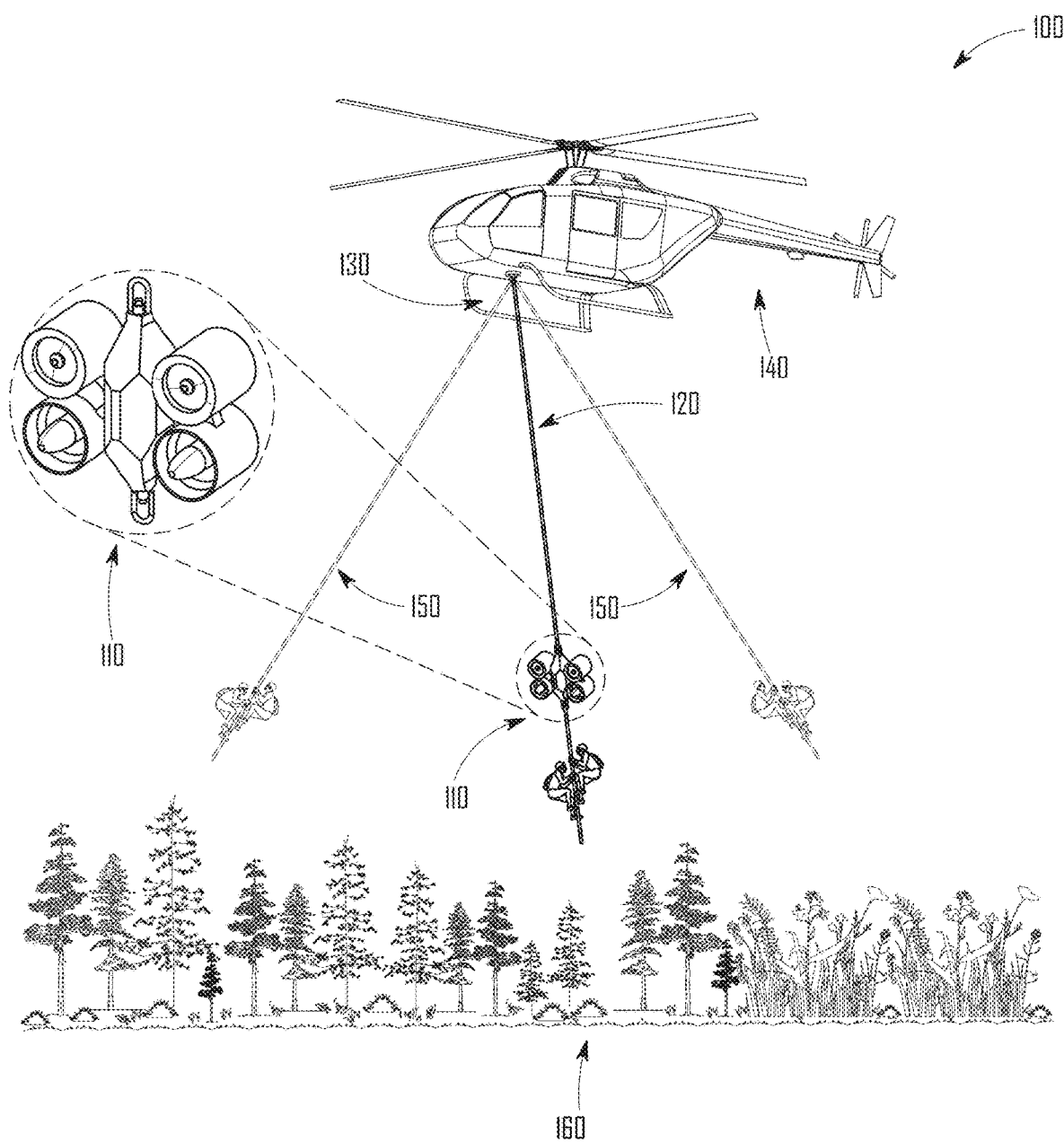
FIG. 1 schematically illustrates a swinging load suspended from a helicopter and stabilized by a suspended load stability system ("LSS").

The general approach for controlling swinging load behavior is to install countermeasures on the airframe or to manipulate the airframe itself. Some airframes, such as the Sky Crane, have a rail system installed beneath the cabin to mitigate the sway of a load. Most proposed approaches involve installing automated countering algorithms on an aircraft's stability augmentation system. Indeed, crew chiefs who remain within the helicopter during an extraction will try to manipulate the cable by pushing and pulling it from the cabin, efforts that have limited effect. All these measures have proved inadequate.

In various embodiments, as described further herein, an autonomous, unmanned suspended load stability control system addresses this problem. The load stability system ("LSS") of this disclosure counteracts suspended load motion by exerting counterforce from thrusters such as high performance electric ducted fans ("EDFs") at, or near, the location of the load. Consequently the LSS enhances mission safety by completely relieving the pilot and crew of suspended load stability responsibilities. Moreover, the performance envelope of such operations is increased by integrating the capability of the LSS to dynamically control load location, separate from aircraft motion.

The Load Stability System controls the motion of a suspended load through a self-powered, automated, detachable system onto the cable itself between the hoisting system (i.e. helicopter) and the external load. The system is agnostic to the platform from which the load is suspended (e.g., the characteristics of a helicopter "ownship"), as it will independently determine the flight dynamics necessary to stabilize the load. This permits widespread adoption of the system regardless of aircraft type, lowering cost and mitigating solution risks.

The load stability system can provide benefits to helicopter search and rescue ("SAR") and sling load operations, forest fire helicopters, crane operations on Oil Rigs, Navy Support Ships, construction based sling load operations, deep sea drilling applications, space ship control, and civilian firefighting.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein. For example, the embodiments set forth below are primarily described in the context of a helicopter sling load or search and rescue operation. However, these embodiments are illustrative examples and in no way limit the disclosed technology to any particular application or platform.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

FIG. 1 schematically illustrates a swinging load suspended from a helicopter 140 and stabilized by a suspended load stability system ("LSS") 110. The helicopter "ownship" platform 140 suspends a person on a cable 120 from a point 130. Without the LSS 110, the cable and suspended person are liable to swing 150 laterally and/or in conical motion. With the LSS 110, wild swinging is counteracted and eliminated, so that the person can be delivered to the desired point or location of interest 160.

The LSS can take a variety of form factors. FIGS. 1, 2A-2B, 3, and 4A-4C illustrate several different arrangements and housing designs. The illustrated systems each employ two pairs of unidirectional thrusters. In other embodiments, a load stability system could employ bidirectional thrusters in different numbers or arrangements. However, it is not necessary to show such implementation details to describe illustrative embodiments.

Figure 2A:
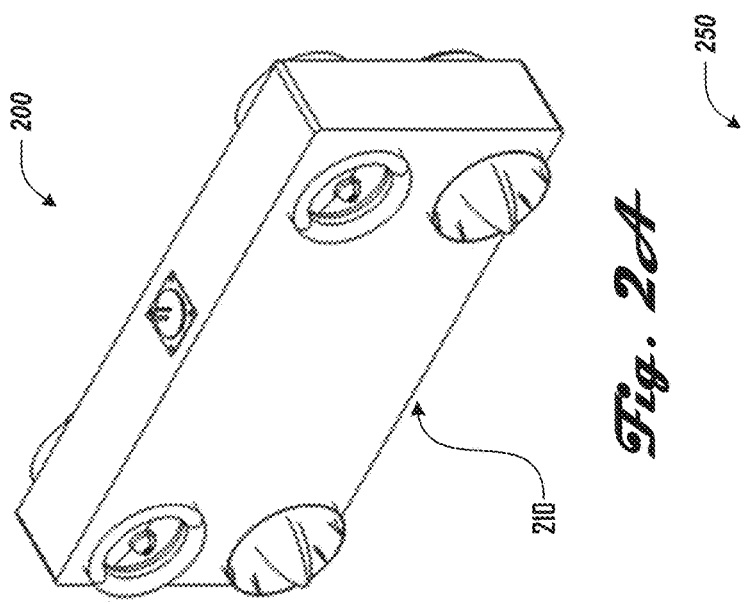
FIG. 2A illustrates an isometric view of a suspended load stability system with a boxlike housing in accordance with one embodiment.

FIG. 2A illustrates an isometric view 200 of a suspended load stability system with a boxlike housing 210 in accordance with one embodiment. The system 210 is completely enclosed within a box-like enclosure, allowing open access only for the thrusters, cable and load attachments, and charging nodes. While the rectangular housing of system 210 is not especially aerodynamic, it may contain and protect a larger cubic volume than other designs. The larger useful internal volume may allow a greater energy capacity (e.g., a larger number of batteries or other power supply means), allowing system 210 to provide more powerful thrusters and/or a longer operational capacity before recharging or refueling.

Figure 2B:
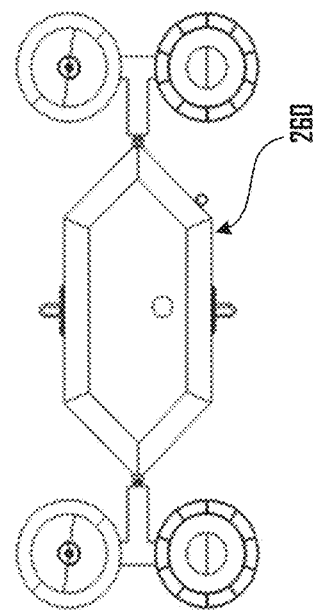
FIG. 2B illustrates a front view of a suspended load stability system including a hexagonal center module and two propulsion arms in accordance with one embodiment.

FIG. 2B illustrates a front view 250 of a suspended load stability system 260 including a hexagonal center module and two propulsion arms in accordance with one embodiment. The system 260 provides an improved aerodynamic profile compared to the system 210 of FIG. 2A. The system 260 also offers more compact storage or stowage, and easier maintenance, by allowing the two propulsion arms to be removable. FIG. 11B below illustrates the system 260 with its propulsion arms removed, and FIGS. 12B-12C illustrate the removable propulsion arms.

Figure 3:
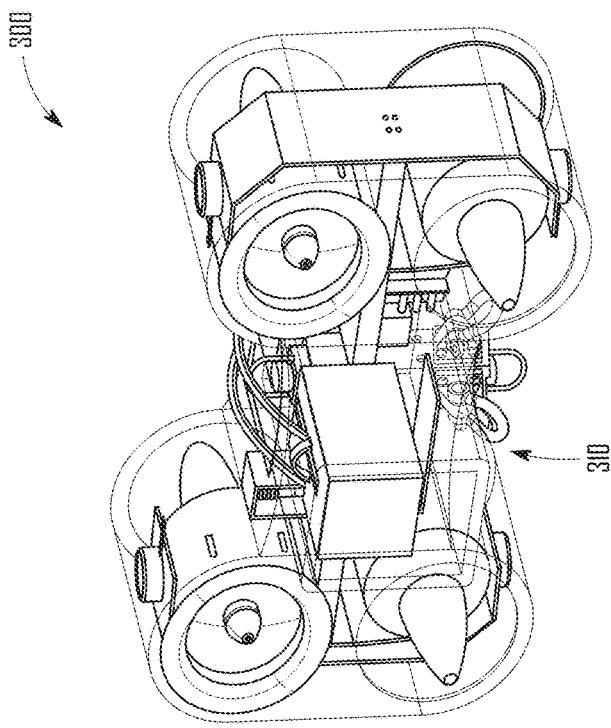
FIG. 3 illustrates a cutaway perspective view of a suspended load stability system showing structural features in accordance with one embodiment.

FIG. 3 illustrates a cutaway perspective view 300 of a suspended load stability system 310 showing structural features in accordance with one embodiment. The system 310 is made up of an internal skeleton and external shell. The external shell is a lightweight material like carbon fiber that surrounds the internal skeleton. The skeleton is made up of a lightweight machined alloy. The cutaway or transparent housing of view 300 shows various internal components and structural elements. The structural elements include a horizontal structural box beam that connects to a C-shaped arm supporting electric ducted fan thrusters above and below the horizontal structural box beam. Atop the C-shaped arms are round sensors, similar to those discussed below with reference to FIG. 14. Also prominently visible is the dark rectangular shape of a battery with power cables attached to power the electric ducted fan thrusters.

In various embodiments, the LSS may be powered by a combination of on-board and remote power. In many environments, all power for the LSS is contained on board, allowing fully autonomous operation without dependence on the availability of external power sources or delivery means. In some situations, a platform from which the LSS is suspended, such as a helicopter or crane, can provide the LSS power through a line extending down the slung cable to the LSS. In some other situations, the platform can provide power to the LSS, which carries a smaller power supply or power reserve on board for intermittent use.

Figure 4A:
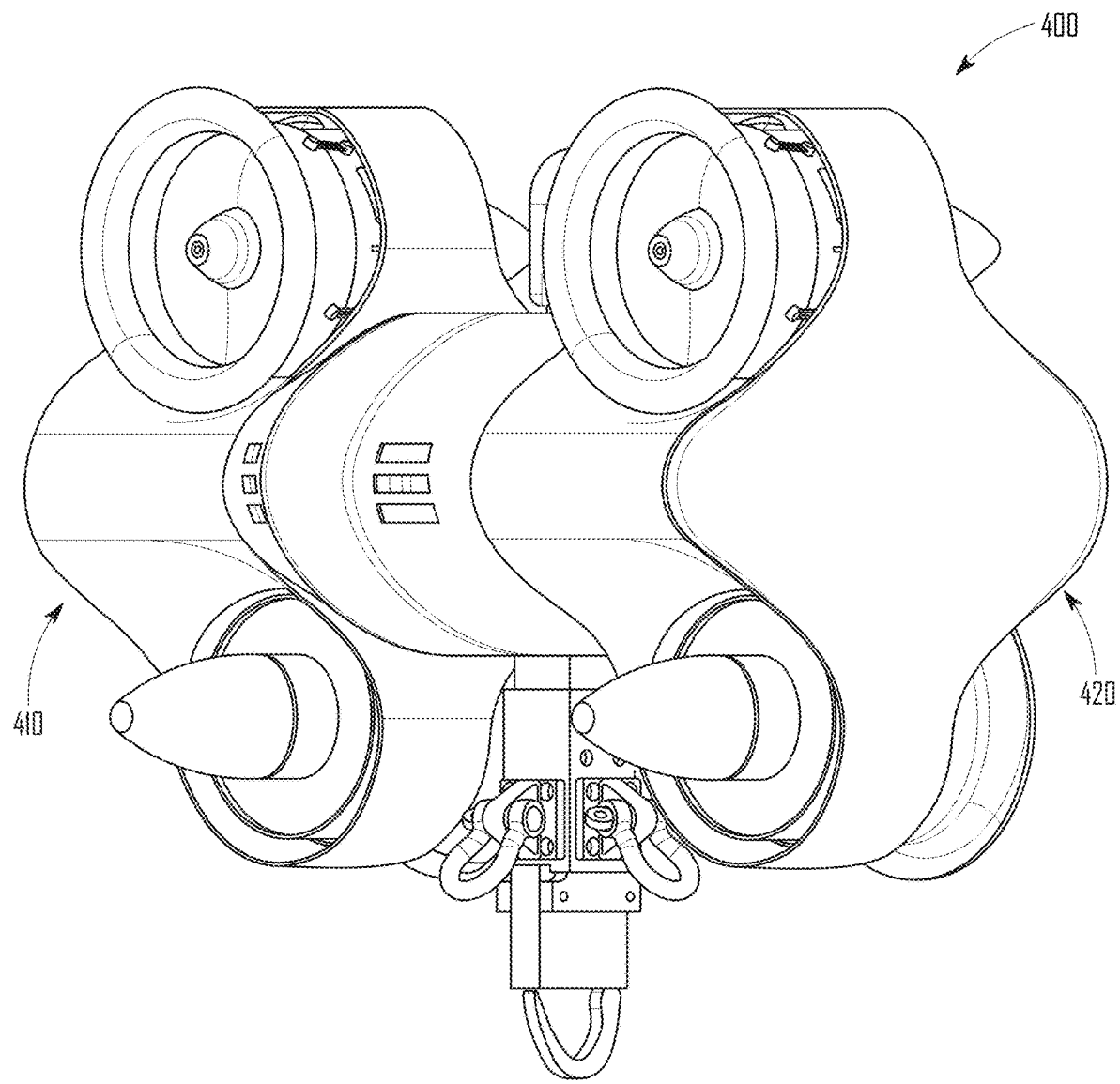

FIGS. 4A-4C illustrate perspective, front, and side views of a suspended load stability system 410 including an aerodynamic housing 420 in accordance with one embodiment. FIG. 4A illustrates perspective view 400, FIG. 4B illustrates front view 450, and FIG. 4C illustrates side view 475.

The housing 420 may be formed of any suitable material such as metal, plastic, glass fiber-reinforced plastic, or carbon fiber. The slim and aerodynamic profile of the illustrated housing 420 provides minimal wind resistance, a short central beam length, improved efficiency for the thrusters, sufficient projection to protect from or divert obstacles, and easy access for maintenance of the LSS. The housing may allow access into the internal space of the LSS via a sealed hatch or one or more removable panels, allowing for maintenance and inspection.

Additional features and construction of the LSS 410 are described in the following Figures.

Figure 5:
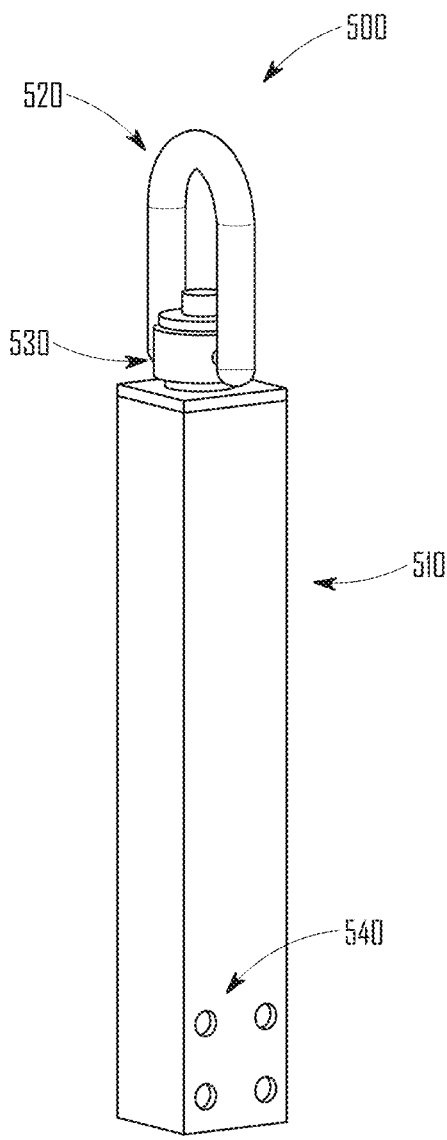
FIG. 5 illustrates a central structural member of a suspended load stability system in accordance with one embodiment.

FIG. 5 view 500 illustrates a central structural member 510 of the suspended load stability system 410 in accordance with one embodiment. The structural member 510 acts as the main tensile beam that carries the load. Therefore it should be constructed as strong as the cable to which it is attached, sufficient to bear the load to be stabilized by the LSS. In various embodiments, the main beam structural member 510 may be constructed of aluminum, steel, or carbon fiber-reinforced plastic, depending on the strength required and the types of loading expected to be encountered. For example, because carbon fiber is a non-isotropic material and on top of tensile loading, sling loads can produce quick, strong impulses that may be off-axis, aluminum or steel would be more appropriate for that application.

At the top of the structural member 510 is a hoist ring 520. The hoist ring 520 can be machined into a full single unit as part of the structural member 510 or can also be bolted to the top of the structural member 510. The hoist ring 520 enables the structural member 510 of the LSS to be attached to an object, e.g., a cable, wire, or rope for suspending a load. For example, the hoist ring 520 may be hooked on the end of a hoist strap or cable from a crane, boom, helicopter, or other lifting apparatus. In some embodiments, the hoist ring is a hook or other attachment mechanism as appropriate.

A rotating bearing 530 allows the hoist ring 520 to spin freely under load. The bearing 530 may include, e.g., a ball bearing interface. The rotating bearing 530 on the hoist ring 520 decouples rotational energy from the twisting or wind-up of the hoisting cable from the LSS and the external load. This allows the LSS to turn beneath the lifting cable without being affected by any twist in the cable, so that the LSS can orient itself (e.g., maintaining or changing orientation) to any direction necessary to stabilize the load. This also reduces twisting moments from the cable from being applied to the load.

In the illustrated embodiment, at the bottom of the structural member 510 is provided with attachment means 540 such as bolting holes for attaching one or more different sleeve options, as illustrated below with reference to FIGS. 6A-6B and 7A-7B.

In some embodiments, instead of a central structural member to which a cable hooks, the load stability system provides a cable attachment mechanism for latching to or around the cable. For example, the load stability system can include a groove or slot for locating the cable and a lever mechanism for retaining or fastening to the cable. By applying force to opposing sides of the cable, the load stability system can be securely mounted to the cable above the load. In some embodiments, such a clamp-on system contains wheels that provide pressure opposite a hard surface, allowing for a pressure clamp. In some embodiments, the wheels can rotate when clamped, allowing the system to ascend or descend the cable.

In embodiments with a cable attachment mechanism for attaching the load stability system to a position along the cable, the cable supports the load directly and the LSS is not mounted between the end of the cable and the top of the load. The LSS is then supported on the cable, so that the LSS does not bear the weight of the load. Embodiments employing such a cable attachment mechanism accordingly do not require a tensile beam through the center of the load stability system apparatus. Additional rotary permitting elements may allow the load stability system to freely rotate around the cable, such as by rotating around the mechanism attached to the cable.

The clamp-on cable attachment mechanism provides a simple interface to existing operating hoist systems and external load systems and does not require direct interference with the cable being used to suspend the load.

Implementation details of such a cable attachment mechanism are further described in provisional U.S. Patent Application No. 62/627,920, filed Feb. 8, 2018, titled "SUSPENDED LOAD STABILITY SYSTEM THROUGH SELF POWERED AUTOMATED ELECTRIC DUCT FAN CONTROL," which is incorporated herein by reference.

Returning to the illustrations, FIGS. 6A-6B illustrate two alternative main beam sleeves 620 that connect to the central structural member 510 for attaching a load in accordance with one embodiment. FIG. 6A illustrates a perspective view 600 of a main beam sleeve 610 including a load hook 630 and four bow or D-ring shackles 640. The shackles 640 are each mounted to a shackle mount 645 secured to the main beam sleeve 610. The load hook 630 is attached to the main beam sleeve 610 by an adapter plate 635. The load hook 630 may be an automatic (e.g., electronically) controlled release hook, or auto-hook, such as one or more remotely activated hooks that are remotely controllable from the cockpit of the aircraft or crane cabin with a button's push. The hook or hooks may permit rotation about the pivot point or restrict the rotation of the suspended object.

FIG. 6B illustrates a perspective view 650 of a main beam sleeve 660 also including a load hook 630 and four bow or D-ring shackles 640. Main beam sleeve 660 also includes four projecting I-beams 670 that are welded or otherwise secured to the sleeve 660, and to which the shackle mounts 645 are mounted.

Figures 7A, 7B:
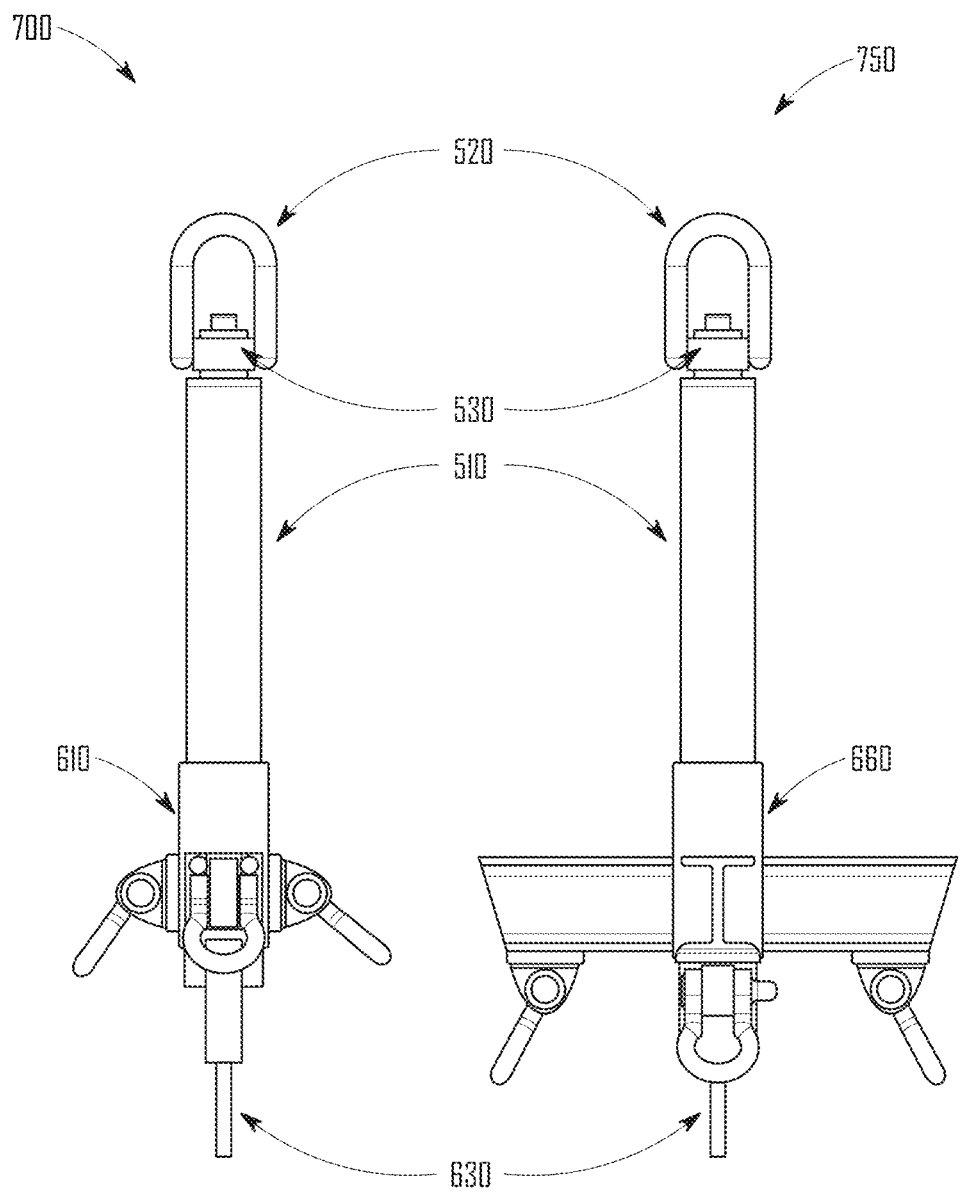
FIGS. 7A-7B illustrate the central structural member attached to each of the two alternative sleeves for attaching a load in accordance with one embodiment.

FIGS. 7A-7B illustrate side views 700 and 750, respectively, of the central structural member 510 attached to each of the two alternative main beam sleeves 610 and 660, respectively, for attaching a load in accordance with one embodiment. FIGS. 7A and 7B show the hoist ring 520 mounted on its rotating bearing 530 at the top of the structural member 510, and the load hook 630 at the bottom of the structural member 510. In the illustrated embodiments, the LSS main beam connects to the load by the load hook 630. In various embodiments, the bottom connection can be a bottom hoist ring, or another attachment mechanism used in, e.g., current day flight operations.

In some embodiments, the LSS provides an interface for suspended loads that couples the motion of the LSS and the suspended load. That is, in the illustrated embodiments, the load hook 630 is configured not to turn or spin independently of the main beam structural member 510; the load is rotationally locked to the LSS. In some embodiments, the LSS load hook interface includes a rotatable fitting similar to the rotating bearing 530 of the hoist ring 520 at the opposite end of the main beam structural member 510, so that the LSS can turn without needing to rotate the load beneath the LSS.

Figure 8:
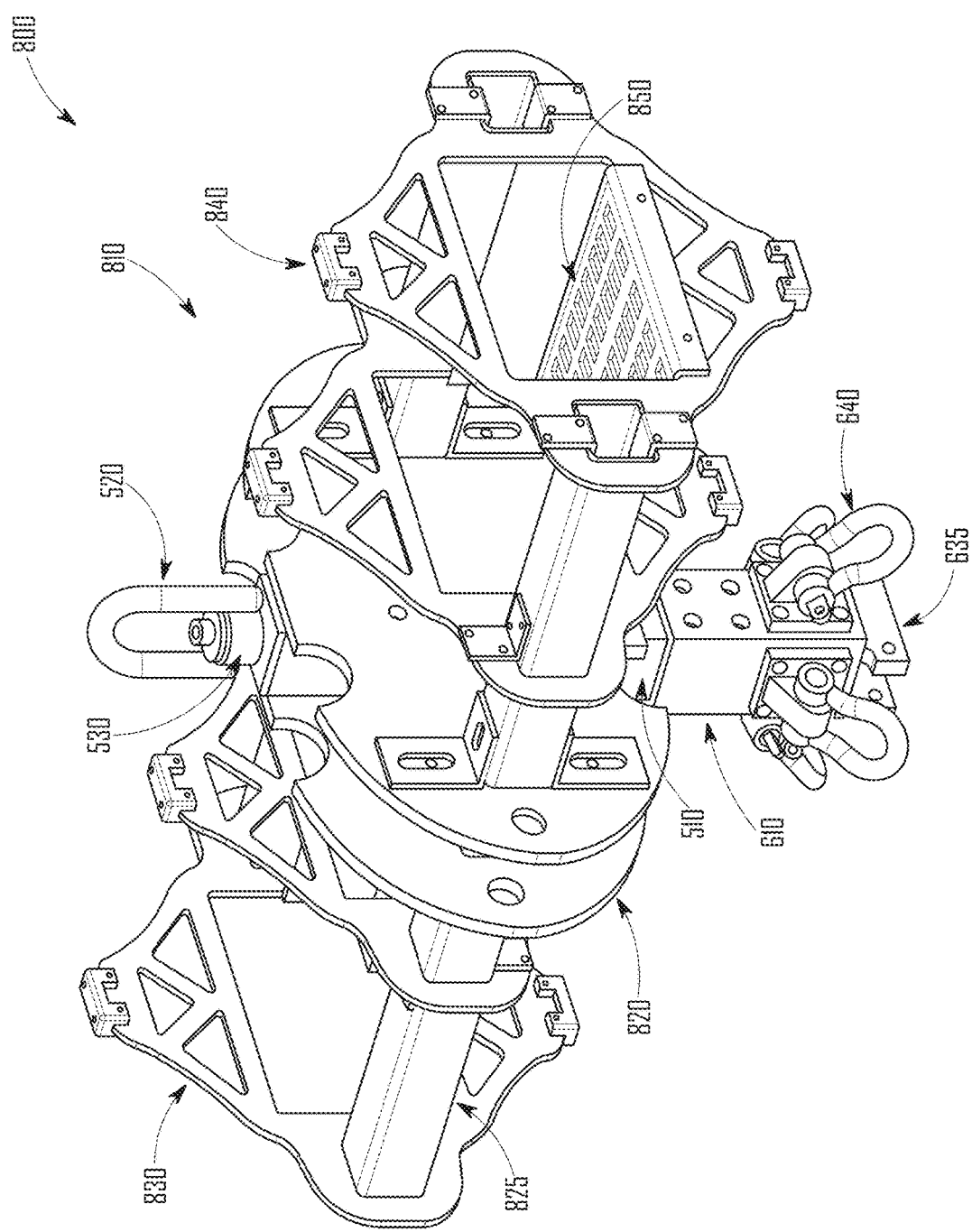
FIG. 8 illustrates a perspective view of a structural framework of a suspended load stability system in accordance with one embodiment.

FIG. 8 illustrates a perspective view 800 of a structural framework 810 of a suspended load stability system 410 in accordance with one embodiment. Like the preceding Figures, FIG. 8 shows the main beam structural member 510 with a hoist ring 520 and rotating bearing 530 on top, and with a main beam sleeve 610 including shackles 640 and a hook adapter plate 635 at the bottom. The framework 810 connected to the structural member 510 includes a pair of oval-profile ribs 820 that support horizontal spars 825. The horizontal spars 825 are formed of hollow tubes, and may be, e.g., carbon fiber.

The horizontal spars 825 in turn are connected to thruster mounting ribs 830 set in parallel with the ribs 820. The thruster mounting ribs 830 include, at their top and bottom extremities, thruster attachment mechanism points 840 for attaching thrusters to the framework 810. In addition, the thruster mounting ribs 830 are configured with a central opening to accommodate a power supply such as a battery in a battery tray 850.

FIG. 9 illustrates a perspective view 900 of components mounted in the structural framework 810 of a suspended load stability system 410 in accordance with one embodiment. In the illustrated embodiment, the battery tray 850 of FIG. 8 is filled with a power supply such as a battery 910. The power supply may be a single power brick, or an array of battery cells wired in series and/or in parallel, such as lithium-polymer (LiPo) cells. The batteries 910 can be removed from the battery tray 850 for easy inspection. The batteries can be charged while installed in the LSS (i.e., without having to remove them) via nodes on LSS 410 that connect to a charging dock. A data link allows a microcontroller unit or processor to monitor power information including (but not limited to) cell voltage and real-time power dissipation or consumption.

In addition, an auxiliary battery 920 is attached to the main beam. The auxiliary battery 920 allows, e.g., a steady supply of power to the processor even if the thrusters draw an excessive amount of power from the main batteries 910.

Thruster controller 930 allows the processor to control the speed, power draw, and thrust of the thrusters. The thruster controller 930 may be, e.g., an electronic speed controller ("ESC") for an electric ducted fan ("EDF"). An ESC typically has at least three connections: to the power supply, to a thruster, and to the processor or a microcontroller, or both. The ESC pulls power from the power supply and allocates it to the thrusters to control the amount of power that should be pushed to the thrusters.

FIG. 10 illustrates a perspective view 1000 of components of a suspended load stability system 410 mounted in the structural framework 810 in accordance with one embodiment. A processor 1010 or central processing unit (CPU) is centrally mounted within the framework 810 in the illustrated embodiment.

The processor 1010 may be an embedded system including a signal board computer and one or more microcontroller units ("MCUs"). The CPU and MCUs are contained within, e.g., a literal black box where all data link connections are made. The black box is a rugged plastic or polymer, protecting the system from environmental and operational factors such as weather and other operational conditions. In some embodiments, the CPU and MCUs are mounted to the same printed circuit board (PCB).

Also mounted within the framework 810 is a wireless transceiver 1020, which may form a separate transmitter and receiver, as well as an antenna for wireless communication. The transceiver 1020 and/or wireless antenna may also be mounted to or printed on the same printed circuit board as the processor 1010.

In the embodiment illustrated in FIG. 10, a vector navigation unit 1030 includes an inertial measurement unit ("IMU"). The IMU provides inertial navigation data to the processor 1010 and is centrally mounted within the framework 810 next to the processor 1010.

Some embodiments of a load stability system are modular. For example, the LSS may be divided into a center module and thrusters or thruster arm assemblies. FIG. 11A illustrates a perspective view 1100 of an alternative center module design 1100 of a suspended load stability system in accordance with one embodiment. The LSS center module 1110 may be configured with a minimum of 2 LSS thruster arms (such as the thruster arms illustrated in FIG. 12D, below), and a maximum of 4 to achieve the desired vectored thrust. Like other LSS embodiments, the system 1110 is self-powered and completely wireless with communication access points for Bluetooth, Wi-Fi, and/or radio frequency (RF) transmission and reception.

FIG. 11B illustrates a front view 1150 of another alternative center module design of a suspended load stability system 1160 in accordance with one embodiment. The LSS center module 1160 contains an emergency shut off mechanism including an emergency shut off pin 1170. The pin 1170 may be connected to a line. The pin 1170 can then be pulled to cause an emergency shut down of the LSS. Internally within the center module, a shutdown pin presence sensor senses the position of the pin 1170 to determine whether it is present or not. The system 1160 can only operate when the pin 1170 is present. If the pin 1170 is not present, the system 1160 will not activate. The pin 1170 can be reinstalled by placing it back into the pin hole.

FIG. 12A illustrates a perspective view 1200 of a thruster 1210 configured for use in a suspended load stability system in accordance with one embodiment. The LSS includes thrusters 1210 connected to the center module. These thrusters 1210 push fluid such as air, water, or gas in a direction to enable movement. For example, a thruster 1210 can include a ducted fan containing an electric motor that turns rotor blades. The rotor blades are contained within an aerodynamic shroud or duct through which fluid is pushed. In the case of a fan, the fluid is air pushed past the rotor blades, causing thrust.

The air is captured through an inlet at the front of the system. In some embodiments, the blades of the thruster 1210 can spin both ways, making the thruster bidirectional. Like other means of propelling fluid, bidirectional thrusters can push air in both the forward and aft directions. In various embodiments, fins molded into the casing of the thrusters help to generate optimal vectored airflow orthogonal to the blade cross-section, i.e., in the fore-and-aft direction of the thruster 1210.

FIG. 12B illustrates a perspective view 1225 of a two-thruster propulsion arm 1230 of a suspended load stability system in accordance with one embodiment. The propulsion arm 1230 is compatible with, for example, the LSS center module 1160 of FIG. 11B above or the load stability system 260 of FIG. 2B above. Some thrusters are more efficient in generating thrust in a forward direction than aft. Therefore fans can be oriented with opposing primary thrust vectors as illustrated in propulsion arm 1230.

In the illustrated embodiment, the LSS has the ability to be broken down into modular units. The thrusters 1210 can disconnect from the arms 1230 for easy storage and the arms 1230 can disconnect from the center module 1160. For example, a push button release pin and an electrical interface enables each of the thrusters and arm combinations to be released and disconnected from the center module 1160.

FIG. 12C illustrates a perspective view 1250 of a support member for a two-thruster propulsion arm 1260 of a suspended load stability system in accordance with one embodiment. The illustrated support member connects around a thruster 1210 and enables the thruster 1210 to connect to the center module 1260. A similar support member that wraps around a thruster 1210 is illustrated in FIG. 3 above.

FIG. 12D illustrates an isometric view 1275 of another two-thruster propulsion arm 1280 of a suspended load stability system in accordance with one embodiment. The propulsion arm 1280 is compatible with, for example, the LSS center module 1110 of FIG. 11A above. The propulsion arm 1280 is configured to fold to simplify storage and deployment. In the deployed state, the propulsion arm 1280 is parallel with the horizontal plane of the LSS center module 1110. The arm is capable of being deployed from 0-90 degrees through, e.g., manual, spring-loaded, or motorized interfaces.

Figure 13A:
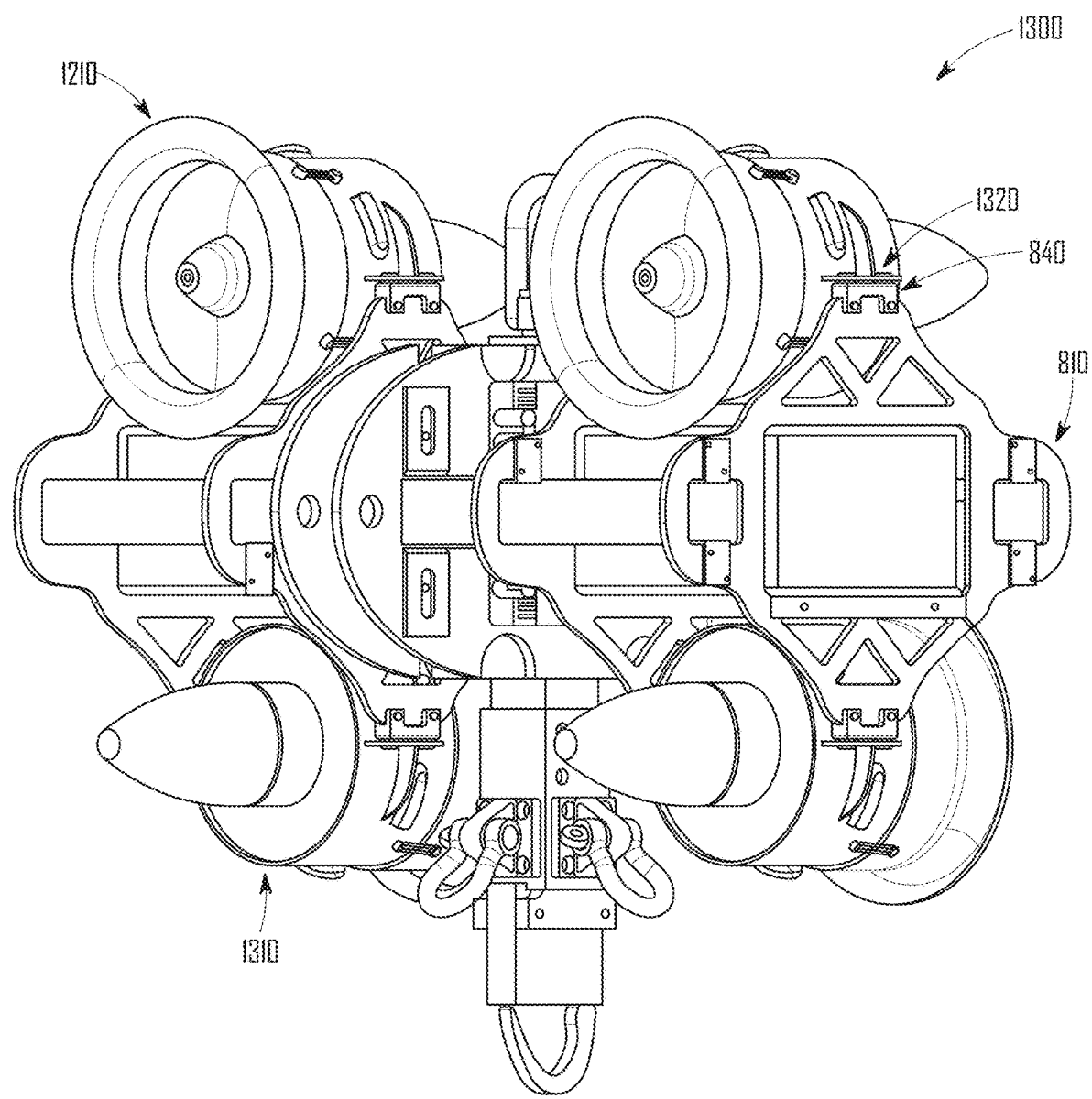

FIGS. 13A-13C illustrate perspective, front, and side views of thrusters mounted in the structural framework of a suspended load stability system 1310 in accordance with one embodiment. FIG. 13A illustrates perspective view 1300, FIG. 13B illustrates front view 1350, and FIG. 13C illustrates side view 1375. In various embodiments, the thruster 1210 includes a mechanism 1320 for connecting to the thruster attachment mechanism points 840 on the ribs 830. In some embodiments, the thrusters 1210 can be attached and removed toollessly. In some embodiments, on the outside of a thruster 1210, there are threaded holes at opposing locations symmetrical to the center of gravity of the fan shroud to which propulsion arms can securely bolt to the thruster 1210.

Thrusters can be connected by a series of wires bundled into a single cable. The wires end with a connector such as but not limited to, multipole ruggedized connector such as an EC5. The female connecting side is on the LSS center module, e.g., at the thruster attachment mechanism points 840 on the ribs 830, while the male is on the thruster 1210 side, e.g., associated with the mechanism 1320 or near the end of an LSS propulsion arm.

Figure 14:
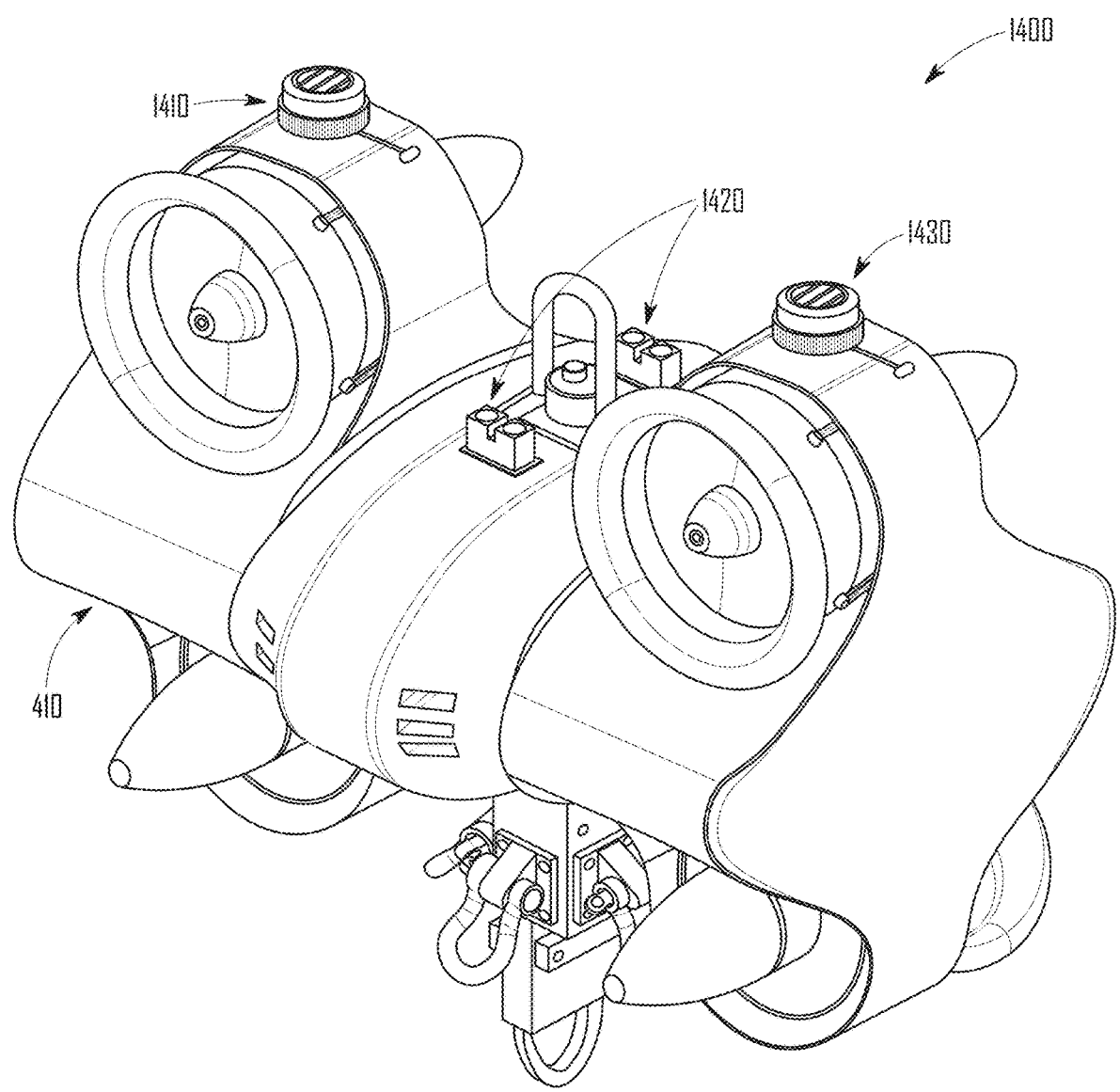
FIG. 14 illustrates a perspective view of a suspended load stability system including sensors mounted on an aerodynamic housing in accordance with one embodiment.

FIG. 14 illustrates a perspective view 1400 of a suspended load stability system 410 including sensors mounted on the aerodynamic housing 420 in accordance with one embodiment. The LSS sensor array may comprise an inertial measurement system, an orientation measurement system, and an absolute position measurement system. The inertial measurement system ("IMS") may include 3 degrees of freedom (3DOF) accelerometers, gyroscopes, and gravitational sensors, which may be microelectromechanical systems (MEMS) sensors. The orientation measurement system may include a magnometer or magnetometer such as a compass, an inclinometer, a directional encoder, and a radio frequency relative bearing system. The absolute position measurement system may include global positioning system (GPS) sensors 1430.

The sensor array may further comprise a proximity sensor or light detection and ranging (LIDAR) system 1410 (e.g., rotating or linear), and/or an optical sensor 1420 such as one or more cameras or infrared (IR) sensors. Proximity sensors may include ground height sensors. Optical sensors can be placed on all sides of the shell facing all directions. Optical sensors can also provide visual information to the user. This information is communicated by the LSS processor, via a data link cable and/or the wireless transceiver. Proximity and optical sensors allow the system to be capable of 360-degree awareness and collision avoidance by detecting obstacles (e.g., a portion of a tree canopy) and altering the course of the LSS to avoid the obstacles. The system is also capable of feeding background (or water) position data to aircraft pilot and crew.

Additional LSS sensors may include a strain sensor to gauge load on the central structural member 510, a rotational encoder or thruster 1210 speed sensor which may be incremental or absolute, and a shutdown pin 1170 presence sensor.

The LSS can use remote positional sensors or beacons, remote computational units, or target node transceiver devices to assist in characterizing the motion of the suspending platform (e.g., a helicopter ownship), the LSS and the suspended load, and a target location of interest such as a person to rescue or a load destination.

The LSS processor 1010 applies algorithms to received sensor system data to yield a desired system response. For example, the GPS sensor may be refined through real-time kinetic (RTK) algorithms to refine absolute position. The measurements are fused together through non-linear data fusion methods such as Kalman filtration methods to yield optimal state estimates in all degrees of freedom to accurately characterize the system's location and motion in the geodetic space.

Figure 15:
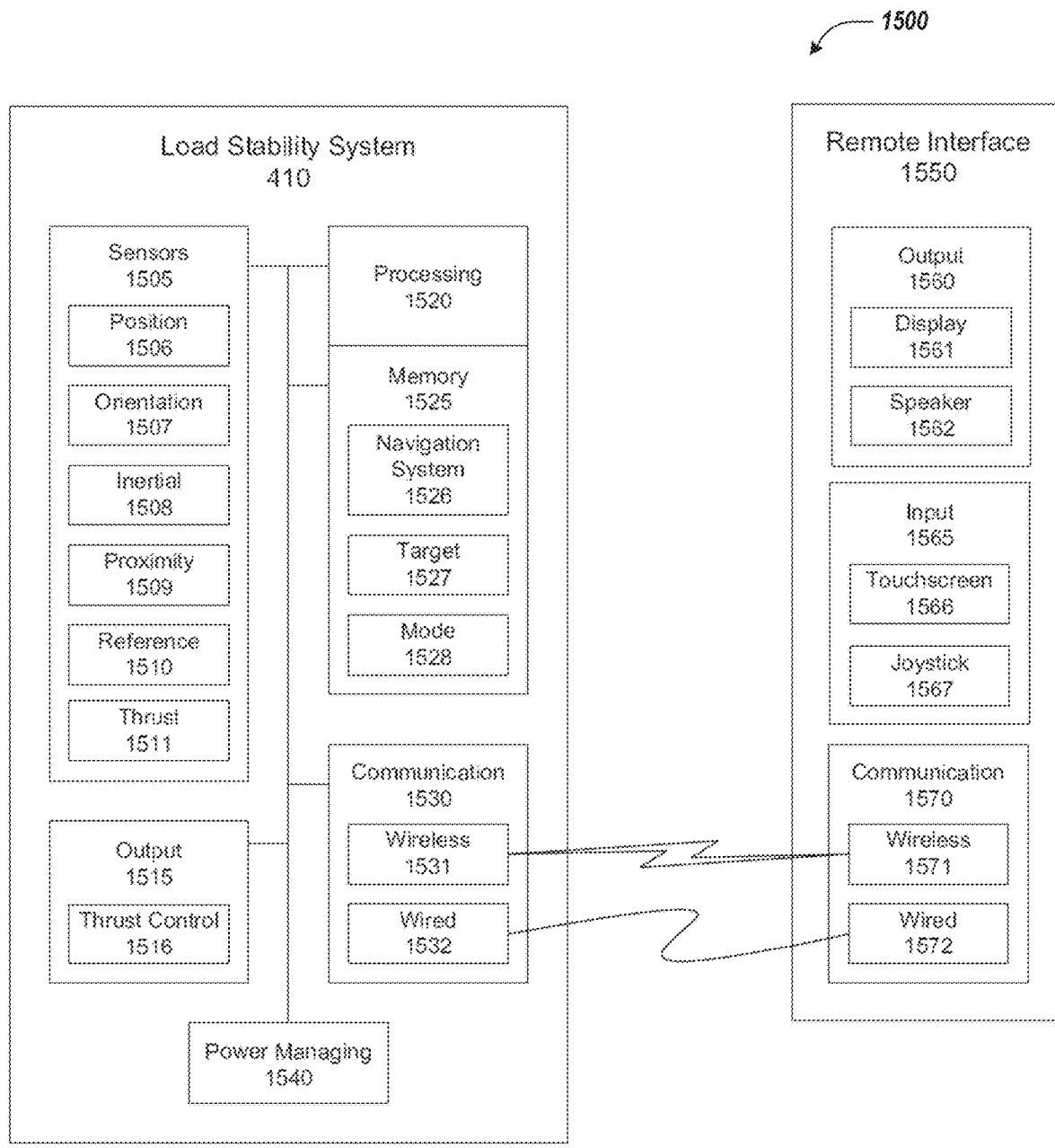
FIG. 15 schematically illustrates operational components of a suspended load stability system including a remote interface in accordance with one embodiment.

FIG. 15 schematically illustrates operational components of a suspended load stability system 410 including a remote interface 1550 in accordance with one embodiment. Within the LSS system 410 are a sensor suite 1505, which can include position sensors 1506, orientation sensors 1507, inertial sensors 1508, proximity sensors 1509, reference location sensors 1510, and thrust sensors 1511. The LSS processing capacity 1520 includes the processor 1010 and microcontrollers. LSS memory 1525 generally comprises a random-access memory ("RAM") and permanent non-transitory mass storage device, such as a solid-state drive, and contains navigation systems 1526, target data 1527, and mode or command state information 1528. Communication systems 1530 include wireless systems 1531 such as the wireless transceiver 1020 and wired systems 1532. LSS output 1515 includes thrust control 1516 via the thruster controllers 930. Power managing systems 1540 regulate and distribute the power supply from, e.g., the batteries 910. A data bus connects the various internal systems and logical components of the LSS.

An interactive display or remote interface 1550 is a computational unit that can be self-powered or hardwired into an airframe. The interactive display 1550 receives data from the LSS, e.g., wirelessly. The data from the LSS is displayed on the interactive display 1550; the computational data is parsed and converted to visual cues. The interactive display also communicates to the LSS the operator's desired command states as discussed below.

The interactive display or remote interface 1550 is in communication with the LSS 410 via communication systems 1570, which may be wireless 1571 or wired 1572. Output 1560 from the remote interface 1550 may include information displayed on a screen 1561 and audio cues 1562. Input 1565 to the remote interface 1550 to control the LSS may include commands through a touchscreen 1566 or a joystick 1567. In various embodiments, the remote interface 1550 may comprise one or more physical and/or logical devices that collectively provide the functionalities described herein.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), or the Internet. In a distributed computing environment, modules can be located in both local and remote memory storage devices. As schematically illustrated in FIG. 15, load stability system 410 and remote display interface 1550 are connected by a wired or wireless network.

Figure 16:
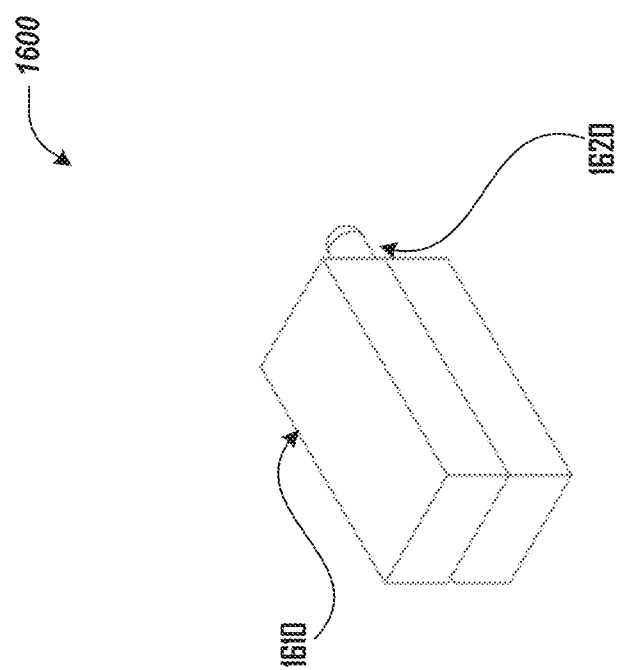
FIG. 16 illustrates a perspective view of a remote positional unit or target node of a suspended load stability system in accordance with one embodiment.

FIG. 16 illustrates a perspective view 1600 of a remote positional unit or target node of a suspended load stability system in accordance with one embodiment. The remote positional unit or target node comprises an external sensor suite or beacon that is configured to communicate wirelessly with the LSS as a positional reference. If the LSS is considered the primary sensor suite, a secondary sensor suite location can be the platform from which the cable is suspended, and a tertiary sensor suite location can be a location of interest for the load (e.g., for positioning to obtain or deliver the load).

A remote positional unit can include a positional transceiver configured to communicate with the LSS via its wireless transceiver 1020 and provide a positional reference. For example, a remote positional unit can be attached to a helicopter ownship or crane below which the load is suspended.

In some embodiments, the remote positional unit or target node is a black box made of durable polymer or plastic, large enough to fit into a hand, 1610. The box 1610 has an external antenna on the side or top of the box, 1620. The remote positional unit may be attached to, e.g., the helicopter by magnets, bolts, or any other attachment mechanism. The target node may be dropped to a location on the ground or attached to, e.g., a life preserver or other flotational device, a rescuer, a load to be picked up, a location for a load to be delivered, or an operational specific location.

Figure 17:
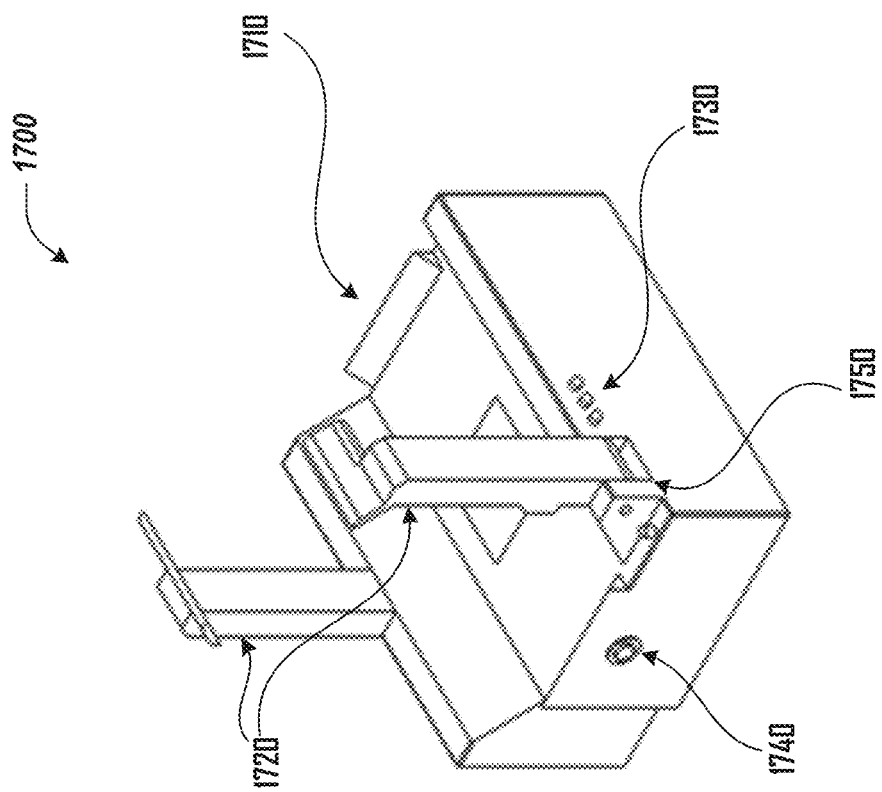
FIG. 17 illustrates a perspective view of a charging station for a suspended load stability system in accordance with one embodiment.

FIG. 17 illustrates a perspective view 1700 of a charging station for a suspended load stability system in accordance with one embodiment. In some embodiments, the LSS can be stored and charged in a charging station in a stationary location or on board an airframe for ease and convenience. The charging station 1710 can run off available power sources such as power aboard a machine like a helicopter or off of generator power.

The charging station 1710 is a dockable station, meaning the LSS can connect and be placed within the charging station 1710 itself. In some embodiments, the docking station has two arms 1720, one on each side of the system; placing the LSS in between the arms until a clicking sound is observed locks the LSS in place. Upon appropriate placement, the LSS electrical contacts placed on the frame of the system will make contact with electrical contacts within the charging station; automatically starting an electric charge of the LSS. The LSS can be released via the push of a button on the side of the charging station, 1740.

To show the user the status of the charge, the charging system has a light indicating the status of the charge, 1730. On top of the charging station, the station has a power switch when operationally needed, 1750. Meanwhile, operators can also turn the charging station on/off and view the status of the charge via portable interactive displays 1550.

Figure 18:
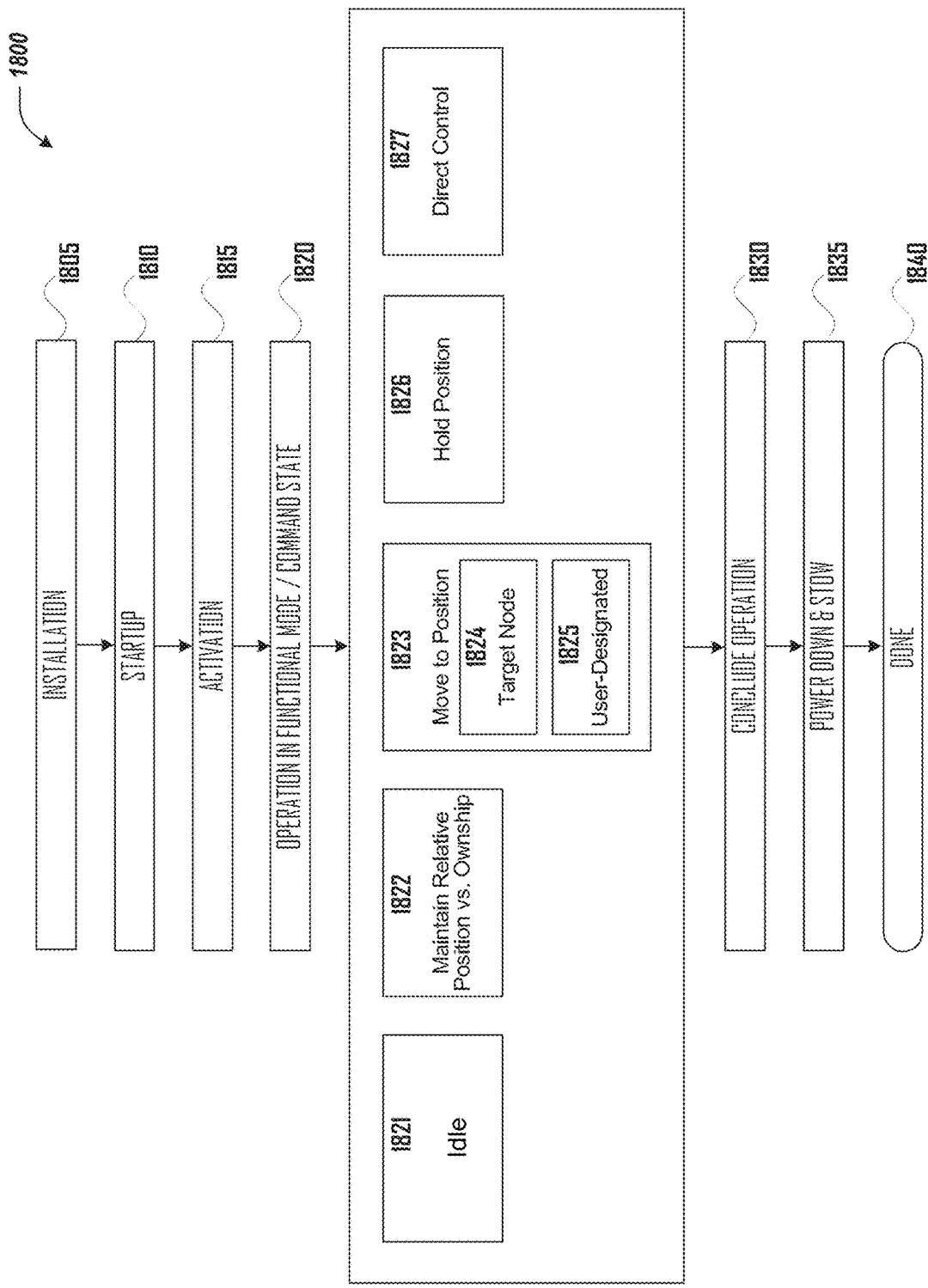
FIG. 18 illustrates an operational routine of a suspended load stability system including multiple modes or command states in accordance with one embodiment.

FIG. 18 illustrates an operational routine 1800 of a suspended load stability system including multiple modes or command states in accordance with one embodiment.

In block 1805, the load stability system apparatus is installed onto the cable from which the load will be suspended. The system need not be powered for installation.

In block 1810, the LSS is started up. In some embodiments, the system can be initialized by the press of a button located on the face of the center module of the LSS. Near the easily accessible external button that can initialize the system, another button may be present that allows for immediate system shut down when pressed. In addition to the initialization interface on the center module, the system can also be initialized by an operator not directly next to the system. One or more external operators, including but not limited to a rescuer on the end of the cable, can initialize the system by pressing a button on one or more interactive displays 1550 linked wirelessly to the LSS.

In block 1815, the LSS is activated, and proceeds to operation 1820 in one of the LSS functional modes or command states selected by the operator. The functional modes or command states of the system are:

Idle mode 1821: all internal systems of the LSS are operating (e.g., the LSS observes its motion and calculates corrective action), but the thrusters are shut off or maintain an idle speed only, without action to affect the motion of the load.

Maintain Relative Position vs. Ownship mode 1822: The LSS is stabilized with respect to the slung origin point. For example, when the LSS is suspended with a load below a helicopter, the LSS will stay directly below the helicopter. The LSS localizes the ownship motion and performs the corrective actions necessary to critically damp any other suspended load motion. If the ownship is traveling at a low speed, the LSS will couple the velocity so the two entities are moving in unison. Upon a disturbance to the load, the LSS provides thrust in the direction of the disturbance to counteract the disturbance, eliminating the swing.

Move to/stop at Position mode 1823: The LSS will stabilize to a fixed position, counteracting the influence of the weather or small movements of the helicopter or other suspending platform. This mode has the effect of killing all motion. The operator can send the desired target position to the LSS via the remote interface 1550. This can be accomplished in at least two ways:

Target node position 1824: The operator can place an LSS remote positional unit or target node 1610 at the desired lowering location (e.g., location 160 of FIG. 1). The target node 1610 will communicate wirelessly with the LSS to indicate the desired position, and the LSS responds by maneuvering to the desired location. The remote interface 1550 UI will receive and display the location information of both entities.

User-designated position 1825: The operator can use the remote interface 1550 UI to send a designated position (e.g., latitude and longitude coordinates) as a commanded location to the LSS. The system will then steadily direct the suspended load to the desired position. The system will simultaneously send feedback to the remote interface 1550 UI regarding position and distance information.

Hold Position mode 1826: The LSS will resist all motion and maintain its current position independent of the ownship's motion. This mode has the effect of killing all motion. This mode has conditional responses respectively to ownship speed, safety factors, and physical constraints.

Direct Control mode 1827: Joystick operation of the LSS in three degrees of freedom. The operator is able to directly control positioning, rotation, and thruster output level. Though the LSS is entirely closed-loop and does not require external control during operation, there is an option for user control.

In block 1830, the operator completes the operation and retrieves the LSS.

In block 1835, the system can be shut down by pushing a button on the interactive display or by pressing the button on the center module itself. If the LSS includes collapsible propulsion arms, they can be folded up. The load is detached from the load hook 630, and then the suspended cable is detached from the hoist ring 520 at the top of the LSS. The LSS may then be stowed in its charger or any convenient location. Routine 1800 is done in block 1840.

Figure 19:
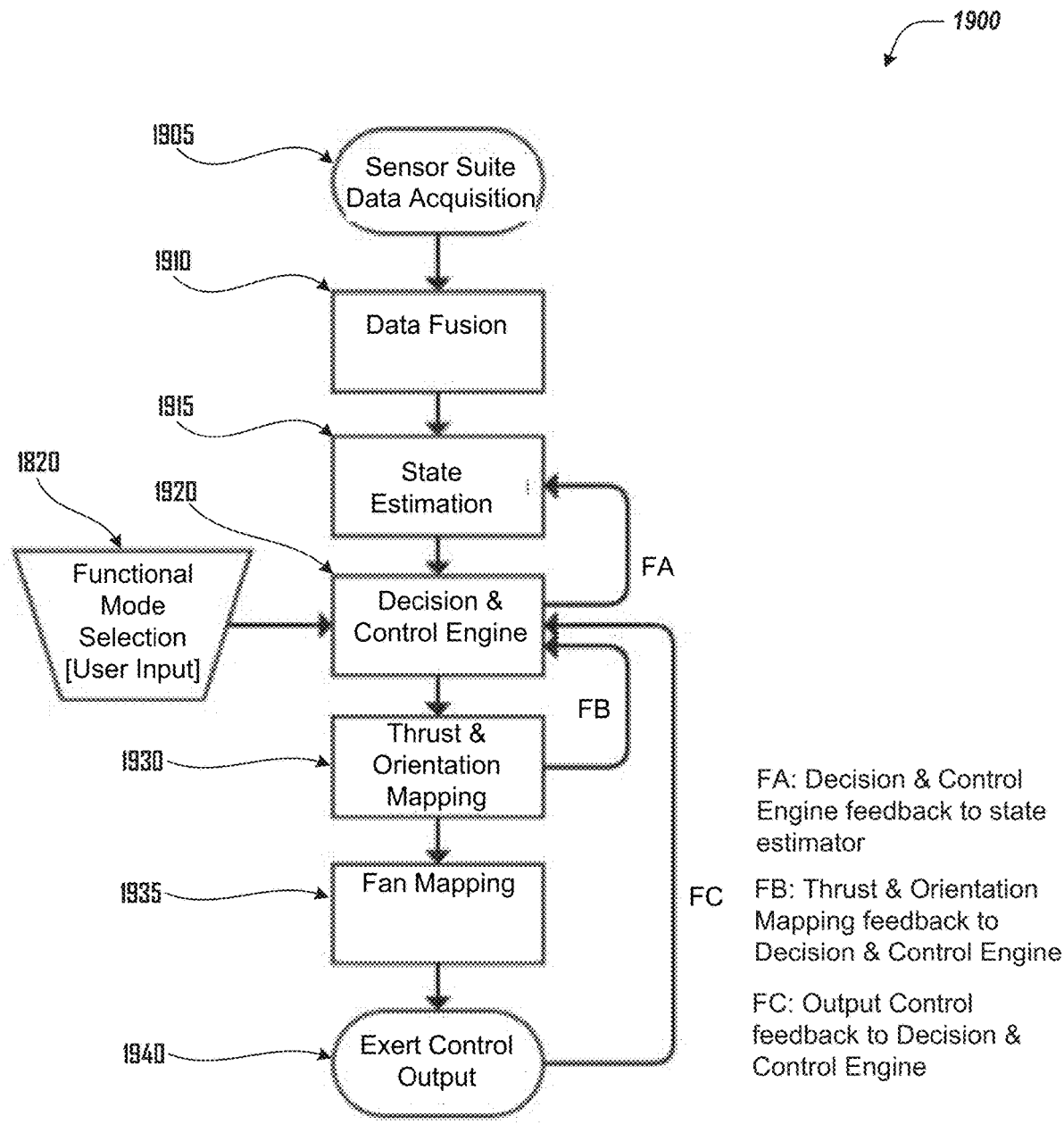
FIG. 19 illustrates a decision and control routine of a suspended load stability system in accordance with one embodiment.

FIG. 19 illustrates a decision and control routine 1900 of a suspended load stability system in accordance with one embodiment. The LSS operates in a closed loop to understand its position and motion in near real time, perform a set of calculations to determine the most desired system response, then send the desired response to the air propulsion system thruster array to mitigate swing of the cable during operations. This process is continuous as long as the system is powered.

The LSS top level control flow diagram 1900 starts in block 1905 with data acquisition from a plethora of sensors including (but not limited to) accelerometer, gyroscope, magnetometer, GPS, lidar/radar, machine vision, and/or range finders.

In block 1910, the LSS combines data from the sensors to obtain a data fusion describing its position, orientation, motion, and environment.

Sensor data is fused and filtered by the LSS through non-linear flavors of the Kalman Filter to yield an accurate representation of the system's state. Traditional closed-loop control methods including fuzzy-tuned proportional, integral, and derivative feedback controllers have bidirectional communication with advanced control methods including deep learning neural nets and future propagated Kalman filters, allowing for further real-time system identification.

In block 1915, the LSS performs state estimation using non-linear state estimators to project near-term future motion based on the data fusion and on feedback from the decision and control engine to the state estimator.

In block 1920, the LSS decision and control engine takes the state estimation 1915, informed by the user-selected functional mode or command state 1820, as well as additional feedback from the thrust and orientation mapping 1930 and output control 1940, and decides how the LSS should move or exert force.

The system algorithmic output is sent to motion controllers at which the desired thrust response will be sent to the electric duct fans via phase control. The net thrust output is mapped in real-time through encoders and load cells then sent back to the Host and Controllers for closed-loop control.

In block 1930, the LSS thrust and orientation mapping applies the LSS decision of how the LSS should move or exert force 1920 to determine a thrust and an orientation to apply the thrust to move or exert force as decided.

In block 1935, the fan mapping applies the determined thrust and orientation to apply the thrust to generate a fan mapping to control the thrusters 1210 to achieve the determined thrust and orientation of the LSS.

In block 1940, the LSS thrusters 1210 exert the commanded control output, implementing a dynamic response in the form of thrust counteracting unwanted motion.

The entire process is unmanned and automated aside from the high-level operator-selected functional control modes. The net output is a control force to stabilize a suspended load.

Status indicator lights may be mounted on various surfaces of the LSS to aid in visibility and operation of the LSS from above and below. For example, the LSS may have external lighting such as LEDs near the thrusters that identify the edges and orientation of the LSS. This allows for improved identification in hard viewing situations such as inclement weather. During operation, both on the interactive display and the system body itself the LED display indicators show that the system is active and convey useful information.

Figure 20:
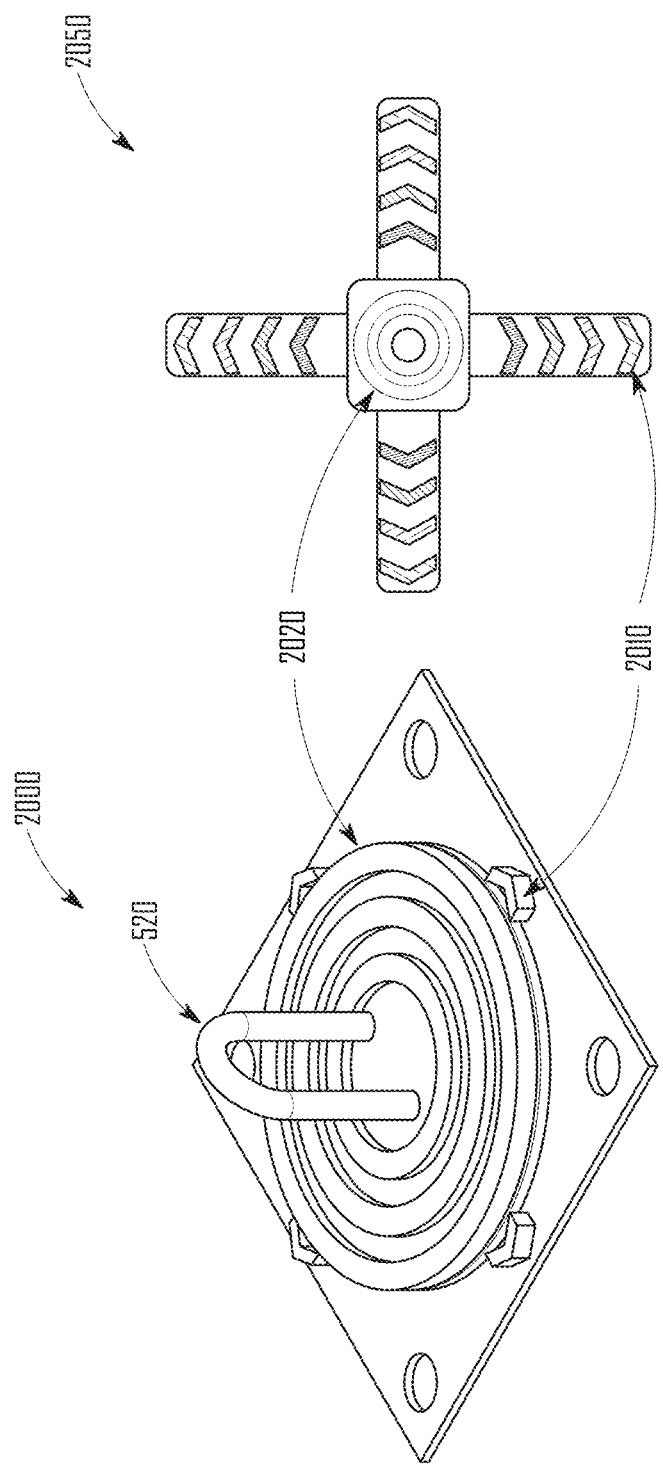
FIG. 20A illustrates a perspective view of a top cable ring with external status indicator lights of a suspended load stability system in accordance with one embodiment.
FIG. 20B illustrates a top view of status indicator lights of a suspended load stability system in accordance with one embodiment.

FIG. 20A illustrates a perspective view of a top cable ring with external status indicator lights of a suspended load stability system in accordance with one embodiment, and FIG. 20B illustrates a top view of status indicator lights of a suspended load stability system in accordance with one embodiment. On top of the LSS housing and around the hoist ring 520, lighted status indicators can represent varied types of information useful to an operator from the LSS.

In some embodiments, a status indicator light display can indicate LSS signal reception integrity. The LSS processor 1010 measures the signal strength and based on predetermined thresholds, changes the colors of the lights to indicate such strength.

Another status indicator may indicate the direction and amount of thrust that the system is exhibiting. In some embodiments, the arrows 2010 are color LEDs in which the innermost arrow pointing outward is green, the next is yellow, the third is orange, and the outer arrow is red. The LSS can light the arrow indicators 2010 to indicate the direction that the system is trying to move the load and use the arrow color hierarchy to depict the system output. For example, a green indicator 2010 may indicate a 5%-25% system output level, yellow may indicate 25%-50%, orange 50%-75%, and red 75%-100%. A high output level also provides an indication to a platform operator such as a crane operator or aircraft pilot to move in the direction indicated by the arrows 2010 to reduce system output and maintain the desired load positioning.

The concentric center ring LEDs 2020 may also include colors, such as a green inner ring, an orange middle ring, and a red outer ring. The circular LED rings 2020 can indicate height of the load above ground. For example, the green ring may indicate a height of more than 25 feet above ground, the orange ring may indicate a height of between 25 feet and 10 feet above ground, and the red ring may indicate a height of less than 10 feet above ground.

In various embodiments, external LSS status indicator lights can be configured to indicate one or more of a position of the LSS, an orientation of the LSS, a distance from obstacles, a height above ground, a signal quality of the wireless transceiver, a mode or command state of the LSS processor, an inertial behavior of the load, an energy capacity or available power of the power supply, a work load or power consumption of the thrusters, the thrust from each thruster, a motion or direction of thrust of the LSS, and a recommended direction for an operator to maneuver the platform suspending the load.

Figure 21:
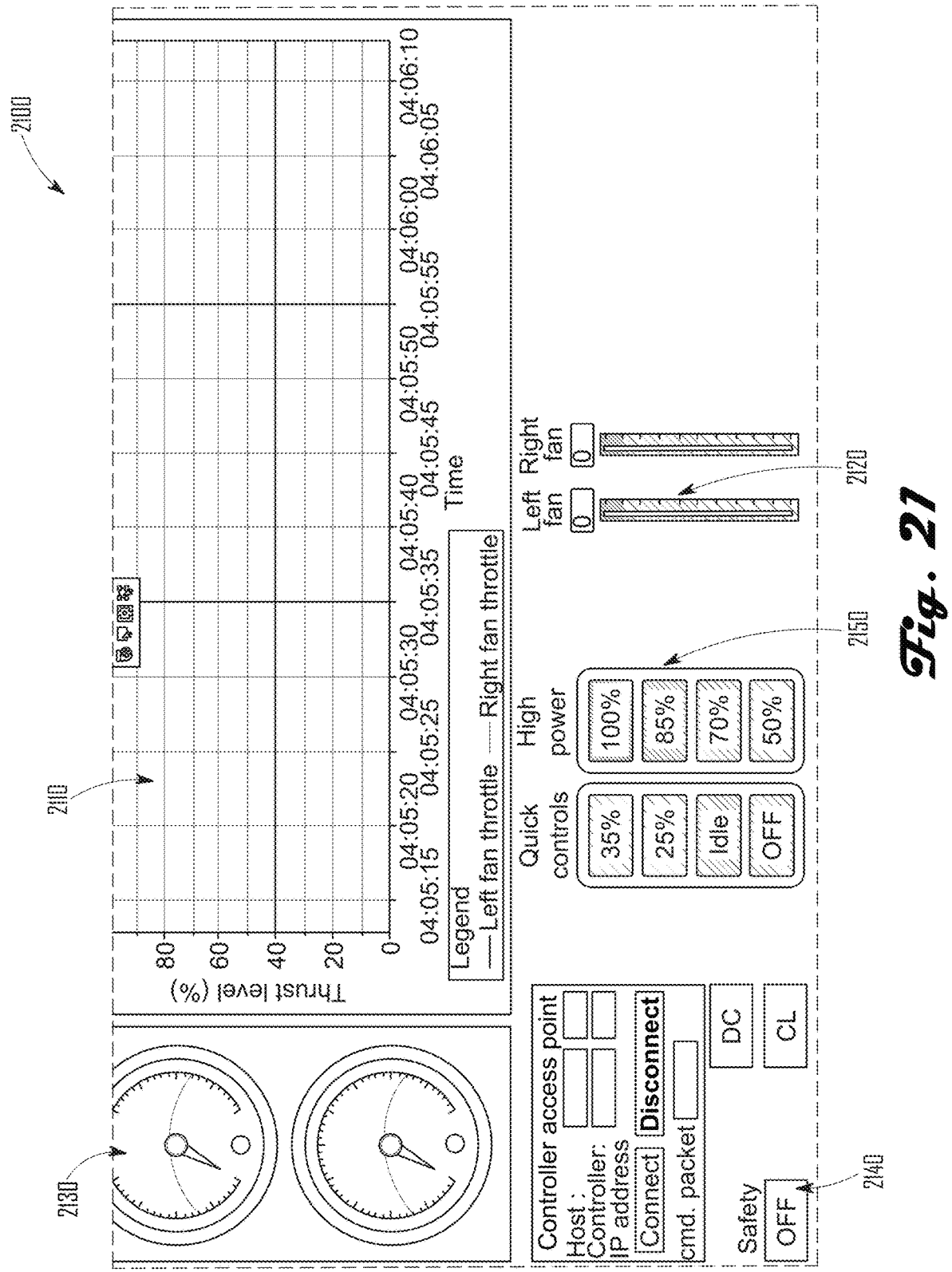
FIG. 21 illustrates a screenshot of a control interface for a suspended load stability system in accordance with one embodiment.

FIG. 21 illustrates a screenshot 2100 of a control interface for a suspended load stability system in accordance with one embodiment. The interactive display 1550 is a computational device in wireless communication with the LSS with a screen that displays indicators for the current state of the system and controls for the system. For example, the illustrated display screenshot includes a graph 2110 of thrust over time for each thruster 1210, and a readout of energy capacity 2120 and gauges for current fan thrust 2130. In various embodiments, the interactive display 1550 will also indicate the position of the LSS system relative to the location of the suspending platform and/or target node. The interactive display 1550 also provides load state feedback in the form of visual (and audible, where appropriate) indicators that describe the load's inertial behavior, suggested measures, and the system's workload in real time.

In various embodiments, the interactive display 1550 contains different buttons 2150 that indicate and select different functional modes or command states of the system, as described above with reference to FIG. 18. Should the operator not be in reach of the LSS, the operator can also initialize the LSS via the interactive display 1550. The control interface 2100 also includes an emergency shut off mechanism 2140 in the form of a bright red "OFF" switch.

Figure 22:
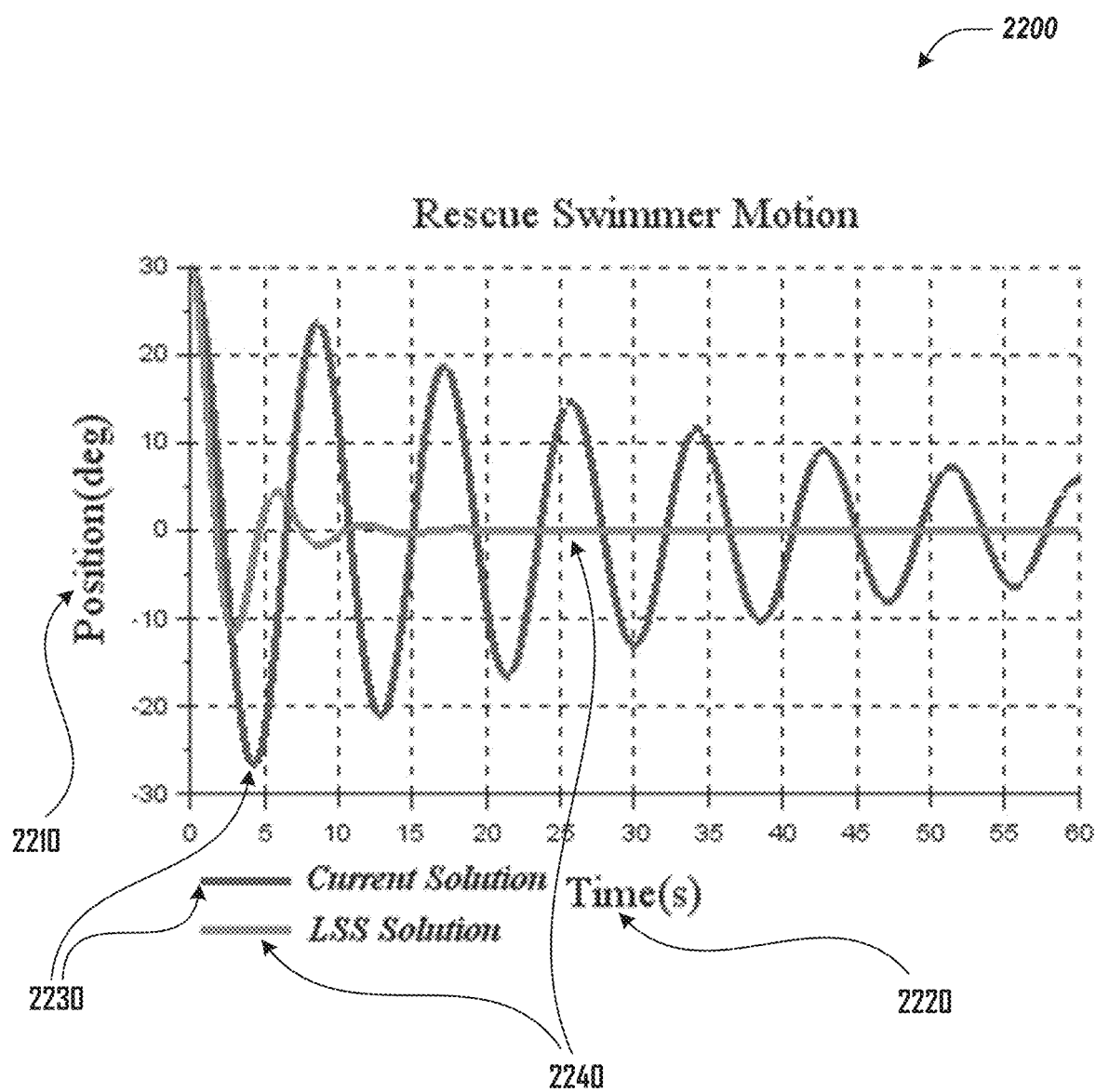
FIG. 22 illustrates a graph plotting the motion of a swinging load and the motion of a load stabilized by a suspended load stability system.

FIG. 22 illustrates a graph 2200 plotting the motion of a swinging load 2230 and the motion of a load stabilized 2240 by a suspended load stability system. On the Y axis, the graph plots angular position (in degrees) of a load 2210, in this case representing a rescue swimmer swinging beneath a helicopter. On the X axis, the graph plots time elapsed (in seconds) 2220 from an initial 30-degree swing, an exceptionally large disturbance due to turbulent winds, while a fully-geared rescue swimmer weighing 100 kg is being lowered onto a boat. Such a large swing from the vertical axis is an exceptionally dangerous situation for the swimmer, the ownship crew, and the people in need on the boat.

Without the LSS, the pilot would gradually regain control of the suspended swimmer 2230 but would continue to sway for an extended time and might ultimately catch or hit the boat's railings and fall to the deck. In contrast, with the LSS, the swimmer is quickly returned to a quiet vertical position beneath the ownship. The LSS dampens the 30-degree oscillating motion to less than one degree in under ten seconds. Incorporating the LSS into such an operation reduces helicopter hovering time and allows the crew chief to safely lower the swimmer onto the boat, ultimately decreasing the operation's risk and duration.

The load stability systems described herein control the pendulum-like motion of an external load attached to a cable through a dynamic air propulsion system to eliminate lateral sway and rotational swinging. The LSS is agnostic to the type of platform from which it is suspended. It characterizes the necessary flight dynamics to perform corrective measures on a suspended loads of all kinds. It is adaptable to external loads, sling loads, and rescue hoist operations, among many other applications that can benefit from a self-contained, self-powered, closed-loop stabilization system that counteracts the pendulum swing of any suspended load.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a helicopter ownship, in other embodiments an LSS may be employed under a construction crane or gantry. This application is intended to cover any adaptations or variations of the embodiments discussed herein.

What is claimed is:

1. A load stability system apparatus for controlling a motion of a load suspended via a cable from above, the apparatus comprising:
    a cable attachment structure, wherein the cable attachment structure is to secure the load stability system apparatus to the cable;
    a load attachment structure, wherein the load attachment structure is to secure the load below load stability system apparatus;
    a sensor array;
    a thruster controller;
    two or more thrusters, wherein the two or more thrusters are controlled by the thruster controller;
    a processor and memory operably connected to the sensor array and the thruster controller, wherein the memory comprises instructions which, when executed by the processor, cause the load stability system apparatus to determine an estimate of a state of the load stability system based on a sensor data from the sensor suite, determine a thrust application vector to move the load stability system apparatus and load toward at least one of a desired orientation, desired location, or desired relative position of the load stability system apparatus and load, use the thrust controller to output a rotational thrust from one of the two or more thrusters to orient the load stability system apparatus along the thrust application vector, and output a thrust along the thrust application vector to move the load stability system apparatus and load toward at least one of the desired location or the desired relative position; and
    wherein the state comprises a position, orientation, and motion of the load stability system apparatus and wherein to determine the state of the load stability system based on the sensor data comprises to fuse and filter the sensor data in a non-linear filter.

2. The load stability system apparatus according to claim 1, wherein the non-linear filter comprises a non-linear flavor of a Kalman filter.

3. The load stability system apparatus according to claim 1, wherein the desired orientation, desired location, or desired relative position of the load stability system apparatus and load is obtained from a command state.

4. The load stability system apparatus according to claim 3, wherein the command state comprises at least one of idling, moving to a location, holding position, maintaining orientation, position, or location relative to a carrier, or directing control based on user input.

5. The load stability system apparatus according to claim 1, wherein the load stability system apparatus comprises a tensile structure, wherein the tensile structure transfers force from the load to the cable and wherein the tensile structure comprises a rotational bearing to allow the load stability system apparatus to rotate separately from the cable.

6. The load stability system apparatus according to claim 1, wherein the load stability system apparatus comprises at least one of batteries or a wireline power connection to a carrier.

7. The load stability system apparatus according to claim 1, wherein the two or more thrusters have a fixed orientation within the load stability system apparatus.

8. A computer implemented method for controlling a load suspended via a cable from above, comprising:
- determining an estimate of a state of the load based on a sensor data from a sensor suite;
- determining a thrust application vector to move the load toward at least one of a desired orientation, desired location, or desired relative position of the load;
- outputting a rotational thrust from one of the two or more thrusters to orient the load along the thrust application vector; and
- outputting a thrust along the thrust application vector to move the load toward at least one of the desired location or the desired relative position; and
- wherein the state comprises a position, orientation, and motion of the load stability system apparatus and wherein determining the state of the load based on the sensor data comprises fusing and filtering the sensor data in a non-linear filter.

9. The method according to claim 7, wherein the non-linear filter comprise a non-linear flavor of a Kalman filter.

10. The method according to claim 7, further comprising obtaining the desired orientation, desired location, or desired relative position of the load from a command state.

11. The method according to claim 9, wherein the command state comprises at least one of idling, moving to a location, holding position, maintaining orientation, position, or location relative to a carrier, or directing control based on user input.

12. The method according to claim 7, further comprising transferring force from the load to the cable via a tensile structure and isolating the cable from rotation of the load with a rotational bearing.

13. The method according to claim 7, further comprising obtaining power from at least one of a battery or a power connection with a carrier.

14. An apparatus for control of a motion of a load suspended via a cable from above, the apparatus comprising:
- means for a cable attachment structure, wherein the cable attachment structure is to secure the apparatus to the cable;
- means for a load attachment structure, wherein the load attachment structure is to secure the load below the apparatus;
- means for a sensor array, wherein the sensor array comprises means to obtain a sensor data;
- means for a thruster controller;
- means for two or more thrusters and means for the two or more thrusters to be controlled by the thruster controller;
- means for a processor and memory to determine an estimate of a state of the load based on the sensor data from the sensor suite, determine a thrust application vector to move the load apparatus and load toward at least one of a desired orientation, desired location, or desired relative position of the apparatus and load, use the thrust controller to output a rotational thrust from one of the two or more thrusters to orient the load stability system apparatus along the thrust application vector, and output a thrust along the thrust application vector to move the apparatus and load toward at least one of the desired location or the desired relative position; and
- wherein the state comprises a position, orientation, and motion of the load stability system apparatus and wherein means to determine the state of the load stability system based on the sensor data comprises means to fuse and filter the sensor data in a non-linear filter.

15. The apparatus according to claim 13, wherein the non-linear filter comprises a non-linear flavor of a Kalman filter.

16. The apparatus according to claim 13, further comprising means to obtain the desired orientation, desired location, or desired relative position of the apparatus and load from a command state.

17. The apparatus according to claim 15, wherein the command state comprises at least one of idling, moving to a location, holding position, maintaining orientation, position, or location relative to a carrier, or directing control based on user input.

18. The apparatus according to claim 13, further comprising means to provide power to the apparatus via at least one of batteries or power from a carrier.

19. The apparatus according to claim 13, wherein the means for two or more thrusters comprise means for two or more thrusters with fixed orientation within the apparatus.

* * * * *